United States Patent
Anderson et al.

(10) Patent No.: US 7,636,584 B2
(45) Date of Patent: Dec. 22, 2009

(54) COMPUTING DEVICE AND METHODS FOR MOBILE-PRINTING

(75) Inventors: Jeff M. Anderson, Camas, WA (US);
David M. Hall, Camas, WA (US);
Jeremy Bunn, Kelso, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1160 days.

(21) Appl. No.: 10/688,652

(22) Filed: Oct. 17, 2003

(65) Prior Publication Data

US 2005/0086282 A1 Apr. 21, 2005

(51) Int. Cl.
*H04M 1/00* (2006.01)
*H04M 3/00* (2006.01)
*G06F 3/12* (2006.01)

(52) U.S. Cl. .............. 455/556.2; 455/556.1; 455/557; 455/566; 455/418; 455/419; 455/420; 358/1.1

(58) Field of Classification Search .............. 455/418, 455/419, 420, 556.1, 556.2, 557, 566; 358/1.1
See application file for complete search history.

(56) References Cited

U.S. PATENT DOCUMENTS

| | | | | |
|---|---|---|---|---|
| 6,148,346 A * | 11/2000 | Hanson | ............... | 719/321 |
| 6,553,240 B1 * | 4/2003 | Dervarics | ............... | 455/566 |
| 6,757,070 B1 * | 6/2004 | Lin et al. | ............... | 358/1.1 |
| 6,892,299 B2 * | 5/2005 | Abe | ............... | 713/2 |
| 6,922,725 B2 * | 7/2005 | Lamming et al. | ............... | 709/227 |
| 6,943,905 B2 * | 9/2005 | Ferlitsch | ............... | 358/1.13 |
| 6,967,728 B1 * | 11/2005 | Vidyanand | ............... | 358/1.12 |
| 7,102,783 B2 * | 9/2006 | Morooka et al. | ............... | 358/1.15 |
| 7,145,679 B2 * | 12/2006 | Hitaka | ............... | 358/1.15 |
| 7,199,890 B2 * | 4/2007 | Kawamoto | ............... | 358/1.14 |
| 2002/0013869 A1 * | 1/2002 | Taniguchi et al. | ............... | 710/33 |
| 2002/0078160 A1 * | 6/2002 | Kemp et al. | ............... | 709/208 |
| 2004/0061894 A1 * | 4/2004 | Yoshida et al. | ............... | 358/1.15 |
| 2004/0184070 A1 * | 9/2004 | Kiraly et al. | ............... | 358/1.15 |

* cited by examiner

*Primary Examiner*—Matthew D Anderson
*Assistant Examiner*—Wen W Huang

(57) ABSTRACT

A driver for a mobile-computing device. The driver comprises a communication interface for communicatively coupling the driver to an application executing on the mobile-computing device and a print service wirelessly coupled to the mobile-computing apparatus. The driver further comprises an interceptor and a graphics device formatter. The interceptor identifies graphics device commands and forwards graphics device commands issued by the application. The formatter, when enabled, renders information desired to be printed from the mobile-communication device to an intermediate format communicated to the print service.

21 Claims, 15 Drawing Sheets

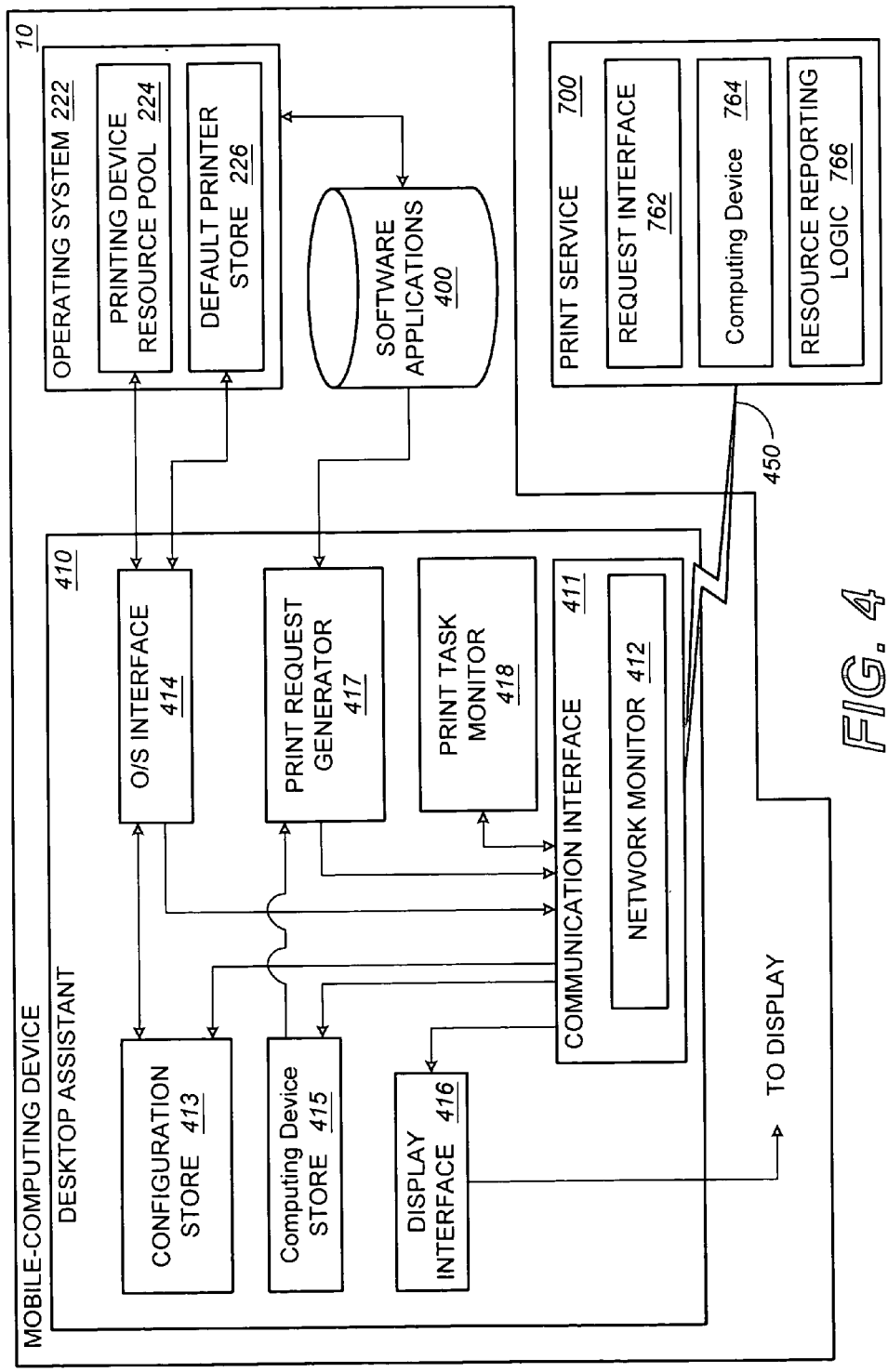

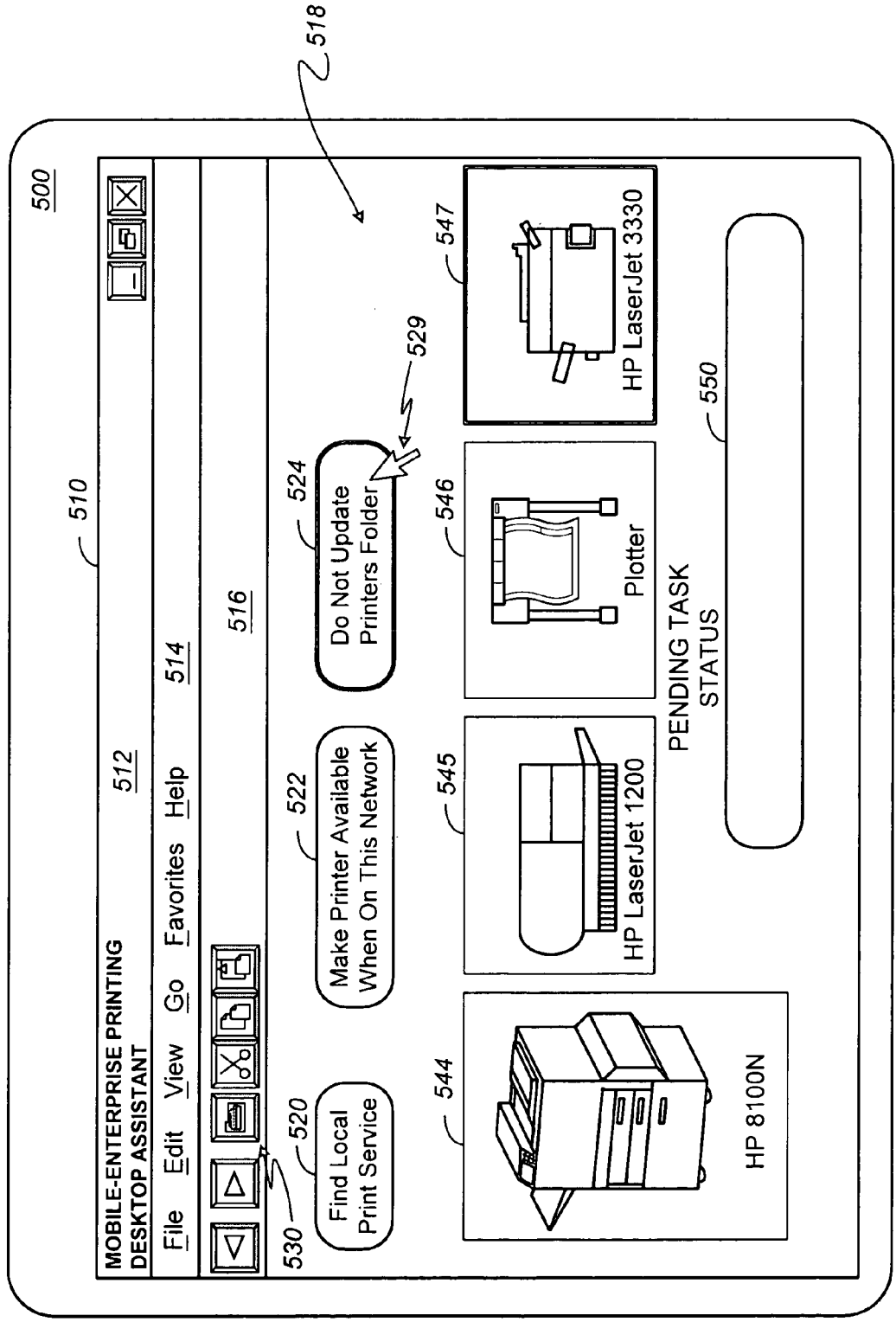

COMPUTING DEVICE AND METHODS FOR MOBILE-PRINTING

BACKGROUND

Portable devices that link users to communication services are popular and widespread. For example, some devices use the infrared data association protocol (IrDA) for line-of-sight data transfers. In addition, other devices use wireless fidelity (IEEE 802.11a and 802.11b wireless networking) or Wi-Fi, Bluetooth®, etc. to support wireless data transfers using a radio-frequency (RF) link. Bluetooth® is the registered trademark of Bluetooth SIG, Inc.

Bluetooth® is particularly useful for data transfers between mobile-computing devices, local-area network (LAN) interfaces, and Internet-service provider (ISP) wireless-access points. Bluetooth® uses a number of RF channels between 2.40 and 2.48 GHz to communicate data. Since Bluetooth® uses a RF-transmission medium, communicating devices do not need to be in the line-of-sight of each other's infrared beam. Bluetooth® also frequency hops. That is, Bluetooth® changes frequencies over a thousand times a second using nearly eighty channels within the 2.40 and 2.48 GHz frequency range. Consequently, even though Bluetooth® shares this frequency range with cordless phones, baby monitors, etc., data transmission disruptions are negligible.

Recent advances in a host of technologies have led to the development of mobile-computing devices that rival the processing power of desktop personal computers. One of the driving forces behind the popularity of mobile-computing devices is the ability to use information accessible to the mobile-computing device via the Internet and other networks from anywhere within the reach of a wireless communication-service provider or a wireless device.

The Internet is a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data packets from node to node across the various networks.

The World Wide Web or web refers to the total set of interlinked hypertext documents residing on hypertext transfer protocol (HTTP) servers all around the world. Documents on the web, called pages or web pages, are written in hypertext mark-up language (HTML) identified by uniform-resource locators (URLs) that identify the particular machine and pathname by which a file can be accessed and transmitted from node to node to the end user using HTTP. HTML-based pages contain standard text as well as formatting codes that indicate how the page should be displayed. A web site is a related group of these documents and associated files, scripts, sub-procedures, databases, etc. that are provided by an HTTP server coupled to one of the various networks.

Users of mobile-computing devices use an application program generally called a "browser" and a communication link to the Internet to access a web site. Browsers are software applications that locate, request, receive, and display content stored within a specific device coupled to the Internet. Popular browsers for laptop and desktop computing devices are graphical browsers. Graphical browsers display graphics including text. Browsers for mobile-computing devices generally display text information, although more recent communication services provide more data rich media such as moving pictures and sound.

Web browsers also enable a user to navigate the Internet, i.e., view HTML files stored on a web-connected device, view data stored on another network, access data stored on a user's computing device, or access data on other data-storage devices. The user can navigate the Internet by entering a URL in an address-entry field provided by the browser or selecting a "link" embedded in a displayed representation of an HTML file. The user can navigate to network-coupled devices by entering appropriate paths in the address-entry field. Once the user has found a folder or file-of-interest, the user can enter a command to view the contents of the folder or open the file-of-interest. When the file-of-interest is a HTML file, the browser displays the file like any other web page. When the file-of-interest is associated with an application program (e.g., a spreadsheet file generated and stored using a particular spreadsheet application program), the mobile-computing device can be configured to open the file with the appropriate application program when the application program is found on the remote-computing device.

The user of a mobile-computing device can download a web page or access other information by locating a file stored on a device connected to the web. Some web pages are configured to coordinate the transfer of a file from an Internet coupled data-storage facility to the mobile-computing device. However, methods for enabling mobile-computing devices to print a file when the computing device is remotely located are problematic.

A first problem concerns how to identify local printers that may be used by a remote user. A second problem concerns how to forward data from a mobile-computing device in a format that is recognizable by the specific printer. To print information from a mobile-computing device, the device must either store or locate a driver that controls the specific printer that the user would like to use. A driver is a software program that translates generic commands typically generated by one or more application programs into device-specific commands understood by the printing device.

SUMMARY

An embodiment of a method for printing information at a remote location includes the steps of establishing a network connection at a remote location, receiving a list of printing devices communicatively coupled to a print service available to a mobile-computing device, requesting a print device context responsive to a printer selected from the list of printing devices, generating the print device context, using an application resident on the mobile-computing device to render information to the print device context, wherein the application generates device commands responsive to the information to be printed, and forwarding the device commands to the print service, wherein the print service renders the device commands against the printer.

BRIEF DESCRIPTION OF THE DRAWINGS

Embodiments of a computing device and methods for printing information from a mobile-computing device at a remote location are illustrated by way of example and not limited by the implementations depicted in the following drawings. The components in the drawings are not necessarily to scale. Emphasis instead is placed upon clearly illustrating the principles of the present computing device and associated methods for printing. Moreover, in the drawings, like reference numerals designate corresponding parts throughout the several views.

FIG. 4 is a functional block diagram of an embodiment of a desktop assistant operable on a mobile-computing device as shown in FIG. 1.

FIGS. 5A-5C include schematic diagrams illustrating an embodiment of a dynamic application interface generated by a desktop assistant application as shown in FIG. 4.

DETAILED DESCRIPTION

Figure 1:
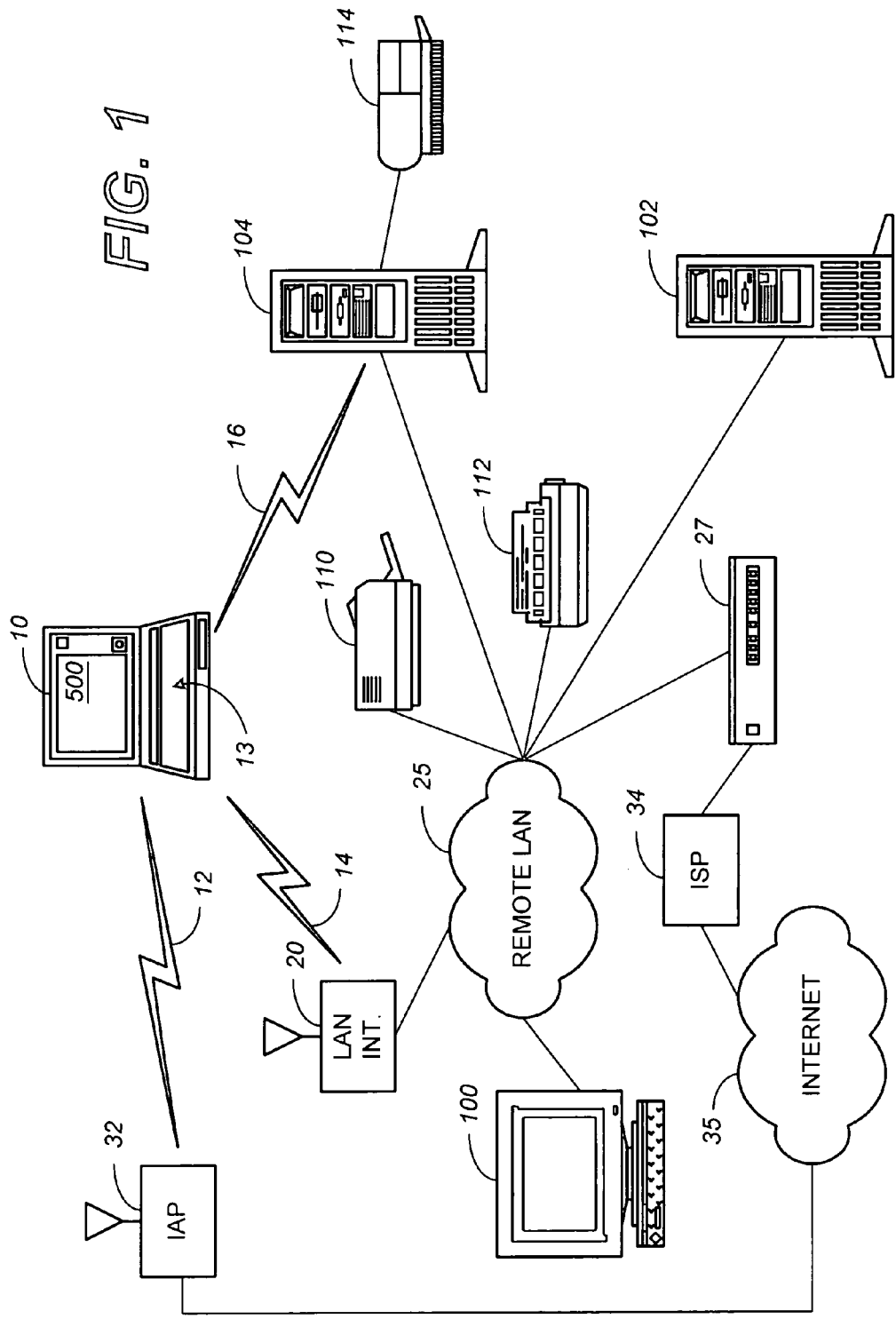
FIG. 1 is a schematic diagram illustrating an embodiment of wireless connectivity from a mobile-computing device.

An embodiment of a mobile-computing device provides a mechanism that enables an operator to communicate with a host of various computing devices via one or more wireless or wired communication links. Any of a number of communication protocols can be used to communicatively couple a mobile-computing device to a print service operable on one of the various computing devices. The print service is configured to support clients with mobile-computing devices that desire to generate a hard-copy product via printer resources managed and controlled by the print service.

A print service is an addressable logical unit capable of performing a multitude of parallel tasks. For example, a print service can be preloaded with a set of drivers corresponding to each printing device coupled to a LAN where the print service is hosted. In one mode of operation, the drivers translate generic print commands generated by the mobile-computing device to printer ready data that is used by the printer to generate a hard copy representation of information stored within the mobile-computing device. In another mode of operation, the print service generates a request for wide area network accessible content such as a web page accessible via the Internet. After the wide area network accessible content is located and obtained by the print service, the print service uses an appropriate driver to translate the content into printer-ready data that the print service forwards to a printer selected by the mobile client via the desktop assistant. In a third mode of operation, the print service locates, retrieves, images, and renders data stored in a local area network data store.

In this way, a mobile-computing device can direct and control a print device to print information stored in a variety of document types across a variety of locations. For example, the print service can be configured with various application software, thus enabling the print service to offload communication, imaging, and rendering tasks associated with printing *.doc, *.xls, *.pdf, *.jpg, *.html, among other file formats.

An embodiment of a desktop assistant operable on the mobile-computing device provides a number of features that assist a mobile client in discovering, configuring, and managing printer resources accessible to the mobile client via the print service. The desktop assistant also provides an interface for generating print-task requests and for displaying progress information associated with pending tasks.

Preferably, the desktop assistant is configured to automatically discover an available print service once a wireless network connection is established. The desktop assistant is also configured with a manual selection mechanism for locating and establishing a communication session with an accessible print service. Once a communication session is established between the mobile-computing device and the print service, the print service can verify mobile-client access rights and user privileges before forwarding local-print resource specific information to the mobile-computing device.

After the introductory formalities have been completed, the print service can verify that the desktop assistant has the latest version of a common driver. When the print service determines that the desktop assistant is not configured with the latest version of the common driver, the print service notifies the desktop assistant that a new common driver is available. The desktop assistant can be configured to accept a new common driver with or without operator confirmation.

Information concerning available printer resources is dynamically added to the desktop assistant user interface. In addition, the available printer resources are automatically added to a printer resources pool on the mobile-computing device. Adding each available printer resource to the printer resources pool on the mobile-computing device and the common driver enables the mobile client to print content from any application operable on the mobile-computing device to any one of the available printing devices. The common driver is a software program that forwards generic commands typically generated by one or more application programs to the print service. The print service contains a device specific driver for each printer under its control and management. The device specific drivers complete the conversion of the generic commands into device-specific commands understood by a select printing device.

Embodiments of the desktop assistant are also programmed to enable a mobile client the option of initiating a print task request by dragging an icon or other representation of content desired to print onto a representation of a select printer in the desktop assistant's user interface. This drag and drop feature is particularly useful when the mobile-computing device is not configured with the particular software application that generated the content that the mobile client desires to print.

In addition, embodiments of the desktop assistant are programmed to store a printer resources configuration file provided by print services at various sites that a mobile client visits. Consequently, when a mobile client revisits a location served by a print server that has previously communicated with the desktop assistant, the desktop assistant can retrieve the previously stored configuration and automatically populate the printer resources pool on the mobile-computing device. When the mobile client removes the mobile-computing device from within range of the wireless communication device or otherwise terminates the communication session with the print service, the desktop assistant reconfigures the printer resources pool to the last configuration or some other desired configuration.

FIG. 1 is a schematic diagram illustrating communication and printing options available to a mobile-computing device 10. In the example of FIG. 1, the mobile-computing device 10 is a laptop computer. Alternatively, the mobile-computing device 10 can be a cellular phone, a personal data assistant (PDA), or other portable devices configured with a wireless interface and software capable of identifying and forwarding content that a mobile client desires to print.

Mobile-computing device 10 includes display 500, and function keys 13. Display 500 presents one or more interactive graphical and/or textual interfaces or menus that are selected and operable via one or more of the function keys 13 or some other operator interface. Alternatively, display 500 can be a touch screen for receiving inputs from a user of the mobile-computing device 10. A user of the mobile-computing device 10 navigates the menus and enters information as required to establish a communication session via local area network (LAN) interface 20 and remote LAN 25 with one or more computing devices 100, 102, 104. As described below, mobile-computing device 10 enables a user to control a communicatively coupled printing device such as printers 110, 112, and 114. More specifically, mobile-computing device 10 communicates with a print service operative on one of the computing devices 100, 102, 104 to print content rich data stored on mobile-computing device 10, one of the computing devices 100, 102, 104 or anywhere across various networks such as the Internet. Content rich data includes web pages, documents, photographs, etc.

Mobile-computing device 10 communicates with one or more network-coupled devices via wireless communication links 12, 14, and 16. Wireless communication links 12, 14, and 16 can be infrared (IR) or radio-frequency (RF) links capable of transferring information from mobile-computing device 10 to each of the receiving devices. A variety of wireless communications interfaces and data transfer protocols support the communication of information from a portable device such as mobile-computing device 10 and an appropriately configured receiving device. For example, infrared data association protocol (IrDA), wireless fidelity (IEEE 802.11b wireless networking) or Wi-Fi, Bluetooth®, etc. each support wireless data transfers. Bluetooth® is the registered trademark of Bluetooth SIG, Inc.

Bluetooth® is particularly useful for data transfers between mobile-computing device 10 and appropriately configured printers, computers (e.g., computing device 104), LAN interfaces (e.g. LAN interface 20), and wireless Internet service provider access points (e.g., Internet access point (IAP) 32). Bluetooth® uses a number of RF channels between 2.40 and 2.48 GHz to communicate data. Since Bluetooth® uses a RF transmission medium, communicating devices do not need to be in the line of sight of each other's IR beam. Bluetooth® also frequency hops i.e., it changes frequencies over a thousand times a second using nearly eighty channels within the 2.40 and 2.48 GHz frequency range. Consequently, even though Bluetooth® shares this frequency range with cordless phones, baby monitors, and 802.11b wireless networks, data transmission disruptions are negligible.

Perhaps, the most significant feature of Bluetooth® technology that makes it well-suited for communicating with a remote device such as the mobile-computing device 10 is that Bluetooth®-enabled devices can find and establish a communication link with each other without the user having to initiate the link. When two Bluetooth®-enabled devices come within signal range of each other, they immediately begin a series of negotiations to determine if they have information for one another. If the negotiation session results in a determination that the devices have information for one another, the devices form a piconet or a personal area network. Consequently, a Bluetooth®-enabled mobile-computing device 10 can automatically establish communication links 12, 14, and 16 with IAP 32, LAN interface 20, and computing device 104, respectively. Furthermore, Bluetooth®-enabled devices rely on a set of rules or profiles for communicating particular types of data. Typical profiles include a serial port profile for communicating printer ready data and or otherwise connecting devices such as printers and scanners. Bluetooth® also includes an object push profile for moving data between devices, a synchronization profile for PDA synch operations, a facsimile profile, which allows a laptop computer to use a Bluetooth®-enabled cellular phone as a facsimile modem.

While Bluetooth®-enabled devices have been described above in association with the schematic of FIG. 1, those of ordinary skill in the art will understand that wireless data transfer protocols IrDA, 802.11(a), 802.11(b), etc. are also capable of establishing a communication link 12, 14, and 16 suitable for enabling communications between mobile-computing device 10 and a print service operable on remote LAN 25. The common driver and methods for mobile printing described herein are not limited to any specific wireless or wired communication protocol.

Accordingly, the present desktop assistant is not limited to Bluetooth®-enabled devices. Moreover, while exemplary embodiments have included wireless communication links, the desktop assistant is not limited to only wireless communication links. For example, an operator of a mobile-computing device configured with the desktop assistant can establish a communication link with a print service operating on a local area network by coupling the mobile-computing device via an Ethernet port associated with the network or via a universal serial bus, a cable, and an appropriately configured network coupled device.

As illustrated in FIG. 1, communication link 12 enables mobile-computing device 10 to communicate with various devices coupled to the Internet 35 via IAP 32. Alternatively, communication links 14 and 16 enable mobile-computing device 10 to communicate with computing devices 100, 102, and 104, as well as printers 110, 112, and 114. As further illustrated in FIG. 1, mobile-computing device 10 can also access Internet coupled devices via remote LAN 25, router 27, and Internet service provider (ISP) access device 34. Consequently, communication links 12, 14, and 16 enable an operator of mobile-computing device 10 to locate, retrieve, and/or interact with data and applications stored in computing devices 100, 102, and 104 as well as data and applications operative and or accessible via Internet 35.

Printer 110 can be a laser printer. Printer 114 can be an inkjet printer. Printer 112 can be an impact printer. The various printing resources i.e., printers 110, 112, and 114, coupled to remote LAN 25 and remote LAN 25 devices are presented by way of example only. Mobile-computing device 10 can direct a print task to printer 114 by transferring print content and a print task request to computing device 104. The print task request can include a reference to content rich data stored on computing device 102 or computing device 100. Alternatively, the print task request can include data stored on the mobile-computing device 10. When remote LAN 25 is coupled to the Internet 35, a print service (i.e., a software application) operable on one or more of the computing devices 100, 102, 104 can download content rich data via Internet coupled data storage devices. As will be described in greater detail below, the print service accesses the referenced content rich data and converts the data into printer ready data using a device specific driver to a designated printer 110, 112, or 114 for printing.

Preferably, printers 110, 112, and 114 are located in physical proximity with mobile-computing device 10. For example, any of the printers 110, 112, and 114 can be located in a kiosk in a public place such as an airport. Alternatively, any of the printers 110, 112, and 114 can be located within a place of business, or within a user's home. In some embodiments, a print service operable on one of the computing devices 100, 102, 104 on remote LAN 25 can control access from various mobile clients to one or more of the printers 110, 112, and 114.

In one embodiment, use of various function keys 13 initiates a seamless integration of these (as well as future) printing models that can be applied to any content delivered to and/or addressable by mobile-computing device 10. In other embodiments various input/output (I/O) interfaces can be used to initiate a communication session between the mobile-computing device 10 and a print service operable on the remote LAN 25. Various I/O interfaces can also be used to initiate a print task request. For example, a pointing device operable with a graphical user interface, a microphone associated with voice recognition software, among other interfaces now known or later developed can be used as input devices to configure the mobile-computing device 10 and initiate print requests. Content includes a full range of printable material from word-processing, spreadsheet, and other office applications, as well as high-resolution photographs, web pages, web accessible coupons, etc.

Figure 2:
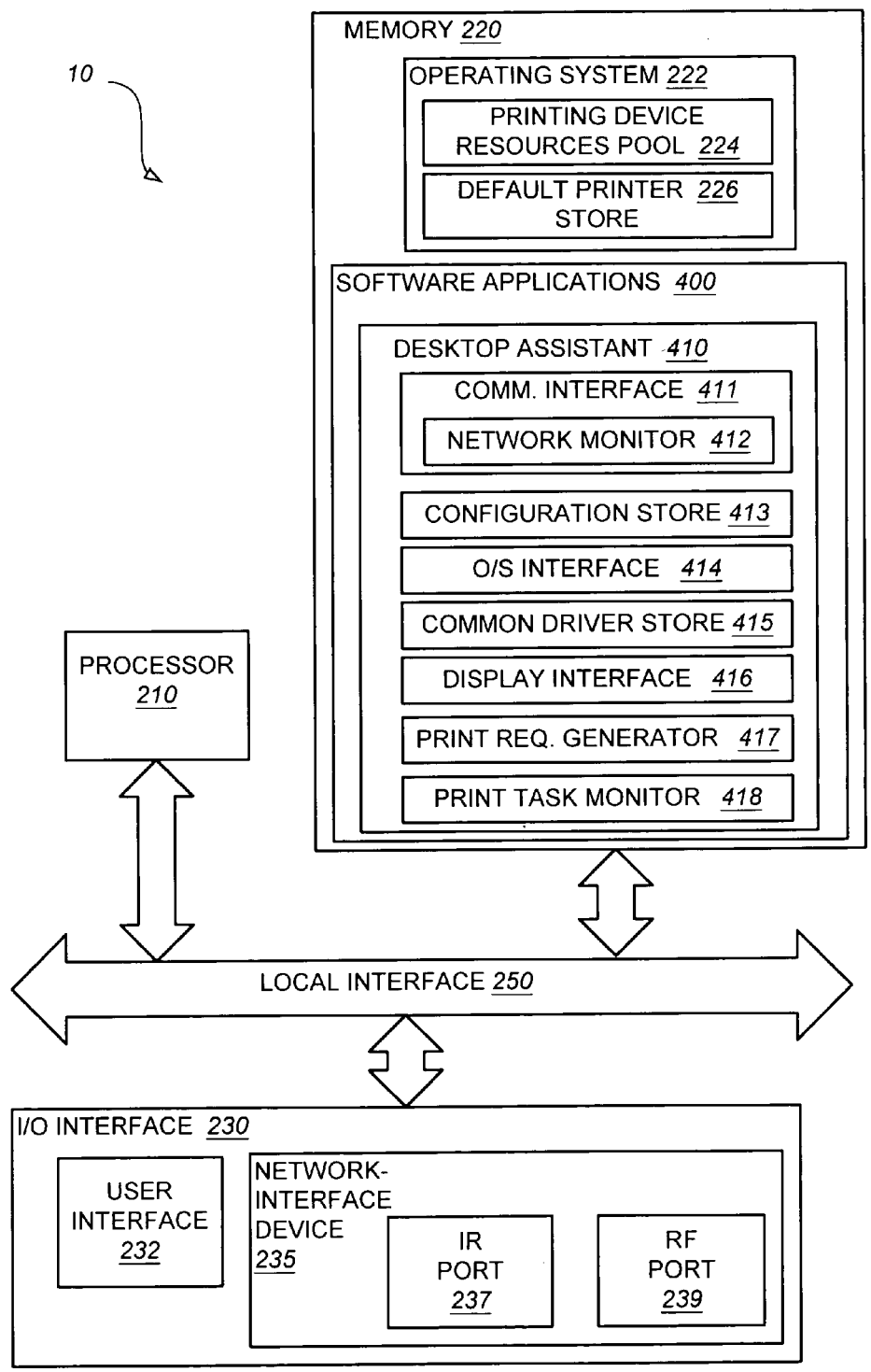
FIG. 2 is a functional block diagram of an embodiment of a mobile-computing device as shown in FIG. 1.

Reference is now directed to FIG. 2, which illustrates a functional block diagram of a mobile-computing device 10 as shown in FIG. 1. Generally, in terms of hardware architecture, as shown in FIG. 2, mobile-computing device 10 includes a processor 210, memory 220, and input/output (I/O) interface(s) 230 that are communicatively coupled via local interface 250.

Local interface 250 can be, for example but not limited to, one or more buses or other wired or wireless connections, as is known in the art or may be later developed. Local interface 250 may have additional elements, which are omitted for simplicity, such as controllers, buffers (caches), drivers, repeaters, and receivers, to enable communications. Further, local interface 250 may include address, control, and/or data connections to enable appropriate communications among the aforementioned components of the mobile-computing device 10.

In the embodiment of FIG. 2, the processor 210 is a hardware device for executing software that can be stored in memory 220. The processor 210 can be any custom-made or commercially available processor, a central-processing unit (CPU) or an auxiliary processor among several processors associated with the mobile-computing device 10 and a semiconductor-based microprocessor (in the form of a microchip).

The memory 220 can include any one or combination of volatile memory elements (e.g., random-access memory (RAM, such as dynamic-RAM or DRAM, static-RAM or SRAM, etc.)) and nonvolatile-memory elements (e.g., read-only memory (ROM), hard drives, tape drives, compact-disk drives (CD-ROMs), etc.). Moreover, the memory 220 may incorporate electronic, magnetic, optical, and/or other types of storage media now known or later developed. Note that the memory 220 can have a distributed architecture, where various components are situated remote from one another, but accessible by processor 210.

The software in memory 220 may include one or more separate programs, each of which comprises an ordered listing of executable instructions for implementing logical functions. In the example of FIG. 2, the software in the memory 220 includes software applications 400, which further includes desktop assistant 410. Software applications 400, including desktop assistant 410, function as a result of and in accordance with operating system 222. Software applications 400 can include one or more commercially available applications as well as proprietary applications. As described above, the applications may be used as part of a process initiated by a mobile client for converting information into a hard-copy product using one or more of the printing resources available to the client via remote LAN 25 (FIG. 1).

Operating system 222 preferably controls the execution of computer programs, such as software applications 400 and desktop assistant 410 and provides scheduling, input-output control, file and data management, memory management, and communication control and related services.

As illustrated in FIG. 2, operating system 222 includes printing device resources pool 224 and default printer store 226. Printing device resources pool 224 includes information associated with each printing device resource (e.g. printers 110, 112, and 114 FIG. 1)) available to the mobile client. The printing device resources pool 224 may include printer names, configurations, and a link to a specific driver. In preferred embodiments, mobile-computing device 10 receives, stores, and associates a common driver for each printing device resource coupled to remote LAN 25 and available to the mobile client. Default printer store 226 contains information identifying a select printer available to the mobile client. Consequently, information within default printer store 226 can be used by software applications 400 to configure a print menu or other print task interface identifying the select printer.

In an embodiment, desktop assistant 410 is one or more source programs, executable programs (object code), scripts, or other collections each comprising a set of instructions to be performed. As shown in FIG. 2, desktop assistant 410 is configured with a communication interface 411, a configuration store 413, an operating systems (o/s) interface 414, a common driver store 415, a display interface 416, a print request generator 417, and a print task monitor 418.

Communication interface 411 contains executable instructions responsive to the remote network monitor 412 that coordinate the functions of the desktop assistant 410. For example, communication interface 411 receives and forwards a common driver to common driver store 415. In addition, communication interface 411 receives and forwards information regarding accessible printers under the control and operation of a local print service to configuration store 413. Communication interface 411 also receives print task requests from print request generator 417 and forwards pending print task parameters to print task monitor 418. Moreover, communication interface 411 forwards information from configuration store 413 and print task monitor 418 to display interface 416 to present the information to the mobile client via display 500 (FIG. 1).

Communication interface 411 further includes a network monitor 412 that records various parameters concerning operation of the communication link between the mobile-computing device 10 and the various devices that can be used to establish a communication session with a print service operable on remote LAN 25 (FIG. 1). Network monitor 412 identifies when a communication link is established and when the link is terminated. Network monitor 412 can also be configured to record various qualitative and quantitative parameters when a particular communication link is active. As described above, the communication link can be wireless or wired, and in other embodiments may contain segments that use both wireless and wired technologies.

Configuration store 413 includes information associated with the various printing devices available to the mobile client. The information can include device names, types, network location, source options, print task options, etc. A print service operable on the remote LAN 25 forwards the information upon receipt of an indication that mobile-computing device 10 is connected to the remote LAN 25. The mobile-computing device 10 is configured to store any previous printer configuration associated with one or more locations that the mobile client frequents that may have been implemented on the mobile-computing device 10. Once the network monitor 412 indicates that the mobile-computing device 10 is out-of-range i.e., no longer communicating with a local print server operable on the remote LAN 25, the desktop assistant 410 can be configured to restore the previous printer configuration. O/S interface 414 handles the transfer of printing device resource pool 224 and default printer store 226 information between operating system 222 and various components of the desktop assistant 410.

I/O interface 230 includes user interface 232 and network interface device 235. User interface 232 includes, but is not limited to, a keyboard, a mouse, or other interactive-pointing devices, voice-activated interfaces, or other operator-machine interfaces (omitted for simplicity of illustration) now known or later developed. Network interface device 235 can include an IR port 237 and/or a RF port 239. The I/O interface 230 may be in communication with the processor 210 and/or the memory 220 via the local interface 250.

I/O interface 230 may also include a video interface that supplies a video-output signal to a display (e.g., display 500 illustrated in FIG. 1) associated with the mobile-computing device 10. Display devices that can be associated with the mobile-computing device 10 are conventional CRT based displays, liquid-crystal displays (LCDs), plasma displays, image projectors, or other display types now known or later developed. It should be understood, that various I/O device(s) in addition to those described above may also be integrated via local interface 250 and/or other interfaces to other well-known devices such as plotters, printers, copiers, etc.

When the mobile-computing device 10 is in operation, the processor 210 is configured to execute software stored within the memory 220, to communicate data to and from the memory 220, and to generally control operation of the mobile-computing device 10 pursuant to the software. The operating system 222, software applications 400, and desktop assistant 410, in whole or in part, but typically the latter, are read by the processor 210, perhaps buffered within the processor 210, and then executed.

Figure 3:
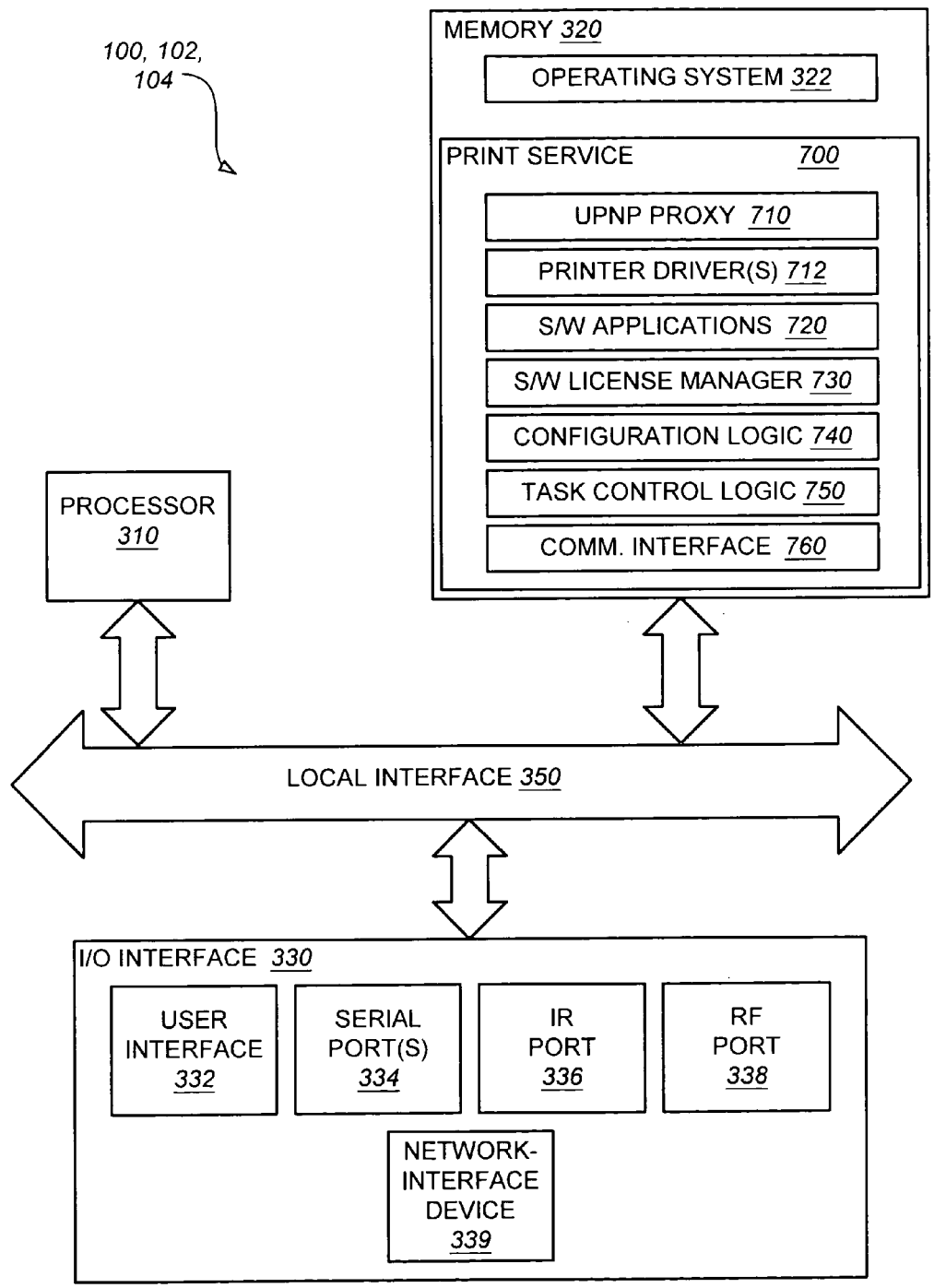
FIG. 3 is a functional block diagram of an embodiment of various computing devices that can be communicatively coupled to a mobile-computing device as shown in FIG. 1.

FIG. 3 illustrates a functional block diagram that generically describes the architecture and operation of the various computing devices 100, 102, 104 of FIG. 1. Note that computing devices 100, 102, 104 can separately and individually enable a print service. In alternative embodiments, a print service can be distributed across two or more the computing devices 100, 102, 104. Generally, in terms of hardware architecture, computing devices 100, 102, 104 include a processor 310, memory 320, and an input/output (I/O) interface 330 that are communicatively coupled via local interface 350.

Local interface 350 can be, for example but not limited to, one or more buses or other wired or wireless connections, as is known in the art or may be later developed. Local interface 350 may have additional elements, which are omitted for simplicity, such as controllers, buffers (caches), drivers, etc. to enable communications. Further, local interface 350 may include address, control, and/or data connections to enable appropriate communications among peripherals coupled to each respective computing device 100, 102, 104.

In the embodiment of FIG. 3, the processor 310 is a hardware device for executing software that can be stored in memory 320. The processor 310 can be any custom-made or commercially available processor, a central-processing unit (CPU) or an auxiliary processor among several processors associated with the respective computing device.

The memory 320 can include any one or combination of volatile memory elements e.g., random-access memory (RAM), such as dynamic-RAM or DRAM, static-RAM or SRAM, etc. and nonvolatile-memory elements e.g., read-only memory (ROM), EPROM, EEPROM, etc. Moreover, the memory 320 may incorporate other types of storage media now known or later developed such as floppy disk drives, hard-disk drives, portable media drives, a redundant array of inexpensive disks (RAID) device, etc. Note that the memory 320 can have a distributed architecture, where various components are situated remote from one another, but accessible by processor 310.

The software in memory 320 may include one or more separate programs, each of which comprises an ordered listing of executable instructions for implementing logical functions. In the example of FIG. 3, the software in the memory 320 includes operating system 322 and a print service 700. The print service 700 includes one or more universal plug and play (UPnP) Proxies 710, one or more printer drivers 712, software applications 720, a software license manager 730, configuration logic 740, task control logic 750, and a communication interface logic 760. UPnP is a networking architecture that provides compatibility among networking equipment, software, and peripherals of the 400+ vendors that are part of the Universal Plug and Play Forum. UPnP works with wired or wireless networks and can be supported on any operating system. UPnP enables device-driver independence and zero-configuration networking.

In an embodiment, print service 700 is one or more source programs, executable programs (object code), scripts, or other collections each comprising a set of instructions to be performed.

Operating system 322 preferably controls the execution of software modules associated with the print service 700 including software applications 720. Operating system 322 controls the execution of UPnP Proxy 710, printer drivers 712, software license manager 730 as well as configuration logic 740, task control logic 750, and communication interface 760. In addition, operating system 322 provides task scheduling, input-output control via I/O interface 330, memory management, and communication control and related services.

I/O interface 330 includes a user interface 332 which may include functional pushbuttons, a touch activated screen, interactive-pointing devices, voice-activated interfaces, or other operator-machine interfaces (omitted for simplicity of illustration) now known or later developed. Serial ports 334 may include a parallel printing interface, a universal serial bus (USB) interface, etc. To communicate, each of the respective computing devices 100, 102, and 104 can be configured with IR port 336 and RF port 338. As previously described IR port 336 and RF port 338 can be configured to support various different wireless communication protocols compatible with the respective computing devices 100, 102 and 104. Network-interface device 339 is configured to support LAN/WAN communications.

It should be understood that the desktop assistant 410 (FIG. 2) and print service 700 including functional items therein such as a common driver can be embodied in any computer-readable medium for use by or in connection with an instruction-execution system, apparatus, or device, such as a computer-based system, processor-containing system, or other system that can fetch the instructions from the instruction-execution system, apparatus, or device, and execute the instructions. In the context of this disclosure, a "computer-readable medium" can be any means that can store, communicate, propagate, or transport a program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium now known or later developed. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Those skilled in the art will understand that various portions of the desktop assistant 410 (FIG. 2) and the print service 700 can be implemented in hardware, software, firmware, or combinations thereof. In separate embodiments, the desktop assistant 410 and the print service 700 are implemented using a combination of hardware and software or firmware that is stored in memory and executed by a suitable instruction-execution system. If implemented solely in hardware, as in an alternative embodiments, the desktop assistant 410 and the print service 700 can be separately implemented with any or a combination of technologies which are well-known in the art (e.g., discrete-logic circuits, application-specific integrated circuits (ASICs), programmable-gate arrays (PGAs), field-programmable gate arrays (FPGAs), etc.), and/or later developed technologies. In preferred embodiments, the functions of the desktop assistant 410 and the print service 700 are implemented in a combination of software and data executed and stored under the control of the mobile-computing device 10 and one or more of the computing devices 100, 102, 104, respectively. It should be noted, however, that neither the desktop assistant 410 nor the print service 700 are dependent upon the nature of the underlying computing device and/or upon the operating system in order to accomplish their respective designated functions.

It will be well understood by one having ordinary skill in the art, after having become familiar with the teachings of the mobile printing desktop assistant 410, the print service 700, and the methods for managing printing resources at a remote location and for printing content from a mobile-computing device 10 that software applications 400, the desktop assistant 410, and the print service 700 may be written in a number of programming languages now known or later developed.

FIG. 4 is a functional block diagram of an embodiment of a desktop assistant 410 communicatively coupled with print service 700 via link 450. Although link 450 is depicted in FIG. 4 as a wireless link, it should be understood that in accordance with FIG. 1, communication link 450 may comprise both wireless and wired communication path segments between mobile-computing device 10 and print service 700.

Communication interface 411 within desktop assistant 410 includes a remote network monitor 412 that detects when communication link 450 is operable. When network monitor 412 senses that the mobile-computing device 10 is communicating with a device coupled to remote LAN 25 (FIG. 1) communication interface 411 receives local printer device configuration information from request interface 762 and a common driver 764 from print service 700. The configuration information includes data suitable for configuring a printing device resource pool 224 for enabling a mobile client to use locally available printing resources. The configuration information may include a device name, a network location, and device operating parameters, among other information, associated with each printing resource that the print service 700 makes available to the mobile client.

Desktop assistant 410 stores the common driver 764 in common driver store 415 and the local configuration information in configuration store 413. The local configuration information may include one or more identifiers unique to the print service 700 and the area where the mobile-computing device 10 is located. The local configuration information can be associated with a user-generated name and stored in configuration store 413. Upon subsequent visits to the area served by print service 700, desktop assistant 410 can automatically configure the mobile-computing device 10 to use printing resources under the management and control of print service 700.

The information in configuration store 413 can be forwarded via O/S interface 414 to operating system 222 to update the printing device resource pool 224. As indicated in FIG. 4, the configuration information also includes indicia of a default printer that can be stored in default printer store 226. Once the desktop assistant 410 is configured as described above, an operator of the mobile-computing device 10 can use conventional interfaces provided with software applications 400 to generate print requests using the common driver 764 at the remote location.

In an alternative embodiment, print request generator 417 is configured to receive content from software applications 400 and use the common driver 764 to generate a print request. Whether the print request is generated using the conventional operating system 222, printing interfaces or print request generator 417, the print request is forwarded via communication link 450 to print service 700. Request interface 762 receives the print request, identifies the designated local printing device and uses a printer specific driver to translate the print request into printer ready data that print service 700 forwards to the designated local printing device to generate the hard-copy product. Print service 700 uses a specific printer device driver (not shown in FIG. 4) to forward printer ready data to a select printer. In contrast, the desktop assistant 410, via print request generator 417, uses a common printer driver when communicating a print request.

As long as mobile-computing device 10 remains within range of one or more wireless communication devices communicatively coupled to print service 700, desktop assistant 410 can receive status information for available printers from resource reporting logic 766. Status information can include a device's network location, online/offline condition, available resource trays, orientation, printer quality settings, etc. While a print request is being processed by print service 700, resource reporting logic 766 can collect and forward information to print task monitor 418.

Display interface 416 is configured to generate a user interface that can be presented on display 500 (FIG. 1) associated with mobile-computing device 10. Display interface 416 can be configured to enable a user of the mobile-computing device 10 to locate a local print service, select an available resource, and configure the local printing device resource pool 224.

Figure 5A:
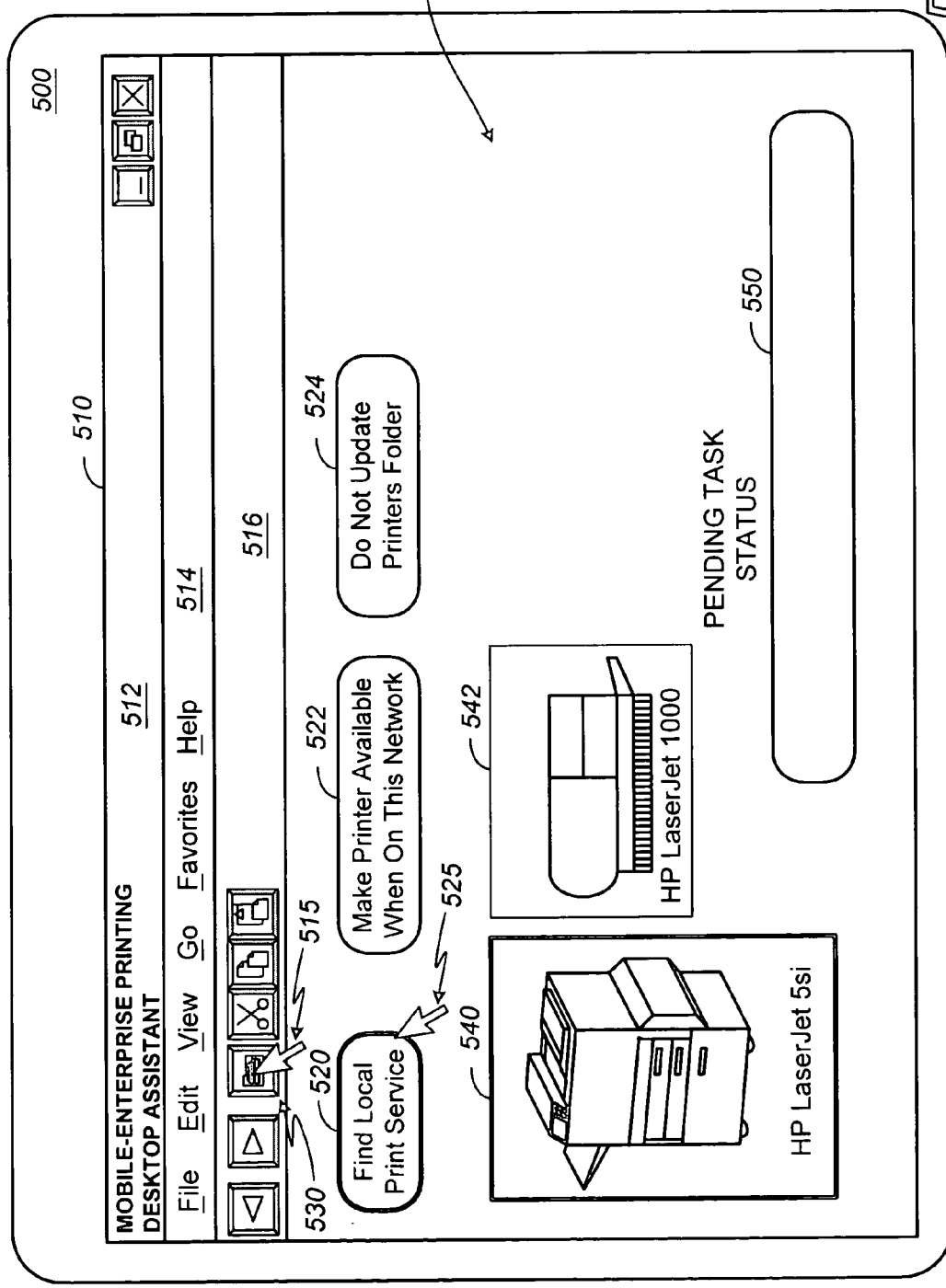
Figure 5B:
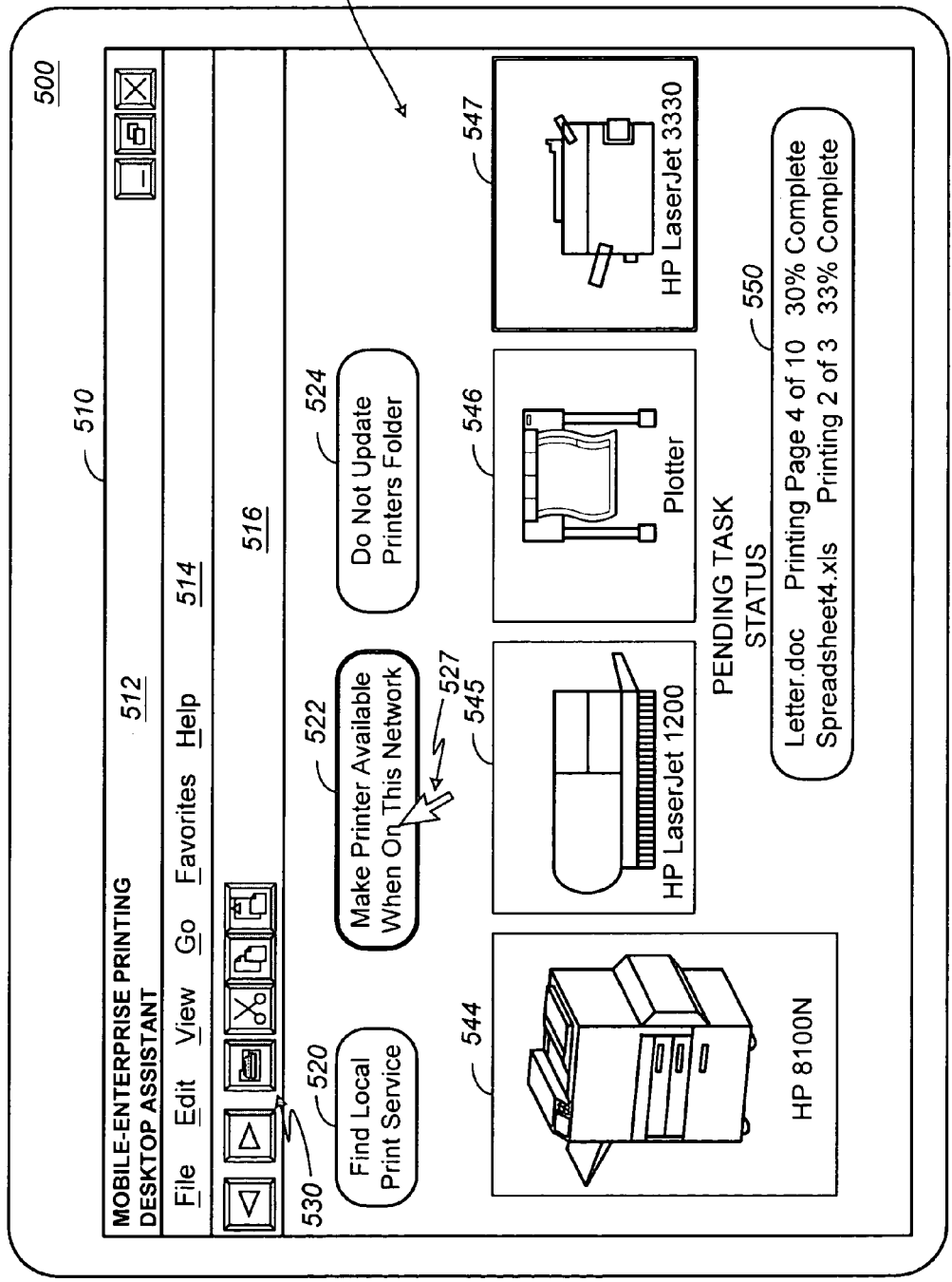

FIGS. 5A-5C include schematic diagrams illustrating an embodiment of a dynamic application interface 510 generated by the desktop assistant application 410 of FIG. 4. The dynamic application interface 510 includes a window label 512, a drop down menu bar 514, and a pushbutton menu bar 516. As illustrated in FIG. 5A, window label 512 is configured with pushbuttons to minimize and maximize the dynamic application interface 510 on display 500. Window label 512 further includes a pushbutton to terminate the desktop assistant 410.

Pushbutton 530 generates an interface that enables an operator of the mobile-computing device 10 to configure printing device resources. Pointer 515 illustrates the location of a pointing device (e.g., a mouse) in a position suitable for generating the printing device resource interface. Panel 518 includes a pending task status reporting area 550, an area for presenting user selectable icons of printing devices such as HP LaserJet® 5si 540 and HP LaserJet® 1000 542, as well as a number of operator selectable switches that can be manipulated to configure the desktop assistant 410. LaserJet® is a registered trademark of the Hewlett-Packard Company of Palo Alto, Calif., U.S.A. Pending task status reporting area 550 remains blank until a print task request is generated and forwarded to print service 700. HP LaserJet® 5si 540 and HP LaserJet® 1000 542 are printers that were available to the mobile-computing device 10 at the last location where the mobile client generated a hard copy product. The location can be a home network, an office network, or other location where the mobile client frequently uses printing resources.

In the embodiment illustrated in FIG. 5A, panel 518 includes a first operator selectable switch 520 labeled, "Find Local Print Service." As indicated by the label, first operator selectable switch 520 configures the communication interface 411 (FIG. 4) of the desktop assistant 410 to continuously search for an available print service accessible via a wireless communication device associated with the mobile-computing device 10. Pointer 525 illustrates the location of a pointing device (e.g., a mouse) in a position suitable for instructing the desktop interface 410 to search for a local print service 700.

Panel 518 further includes a second operator selectable switch 522 labeled, "Make Printer Available When On This Network." In accordance with the label, the second operator selectable switch 522 configures the mobile-computing device to direct print requests to the select printing device. The third operator selectable switch 524 labeled, "Do Not Update Printers Folder" disables automatic configuration of the printing device resources pool on the mobile-computing device 10. An operator of the mobile-computing device 10 can select the third operator selectable switch 524 when the operator does not desire a change to the printing resources pool on the device.

The select printing device in FIG. 5A is set apart by a thicker border surrounding the icon. In other embodiments, various other methods can be used to distinguish a select printing device from the set of available printing devices. These methods include highlighting, the use of color text, checkmarks, check boxes, or other indicia of selection (not shown).

FIG. 5B illustrates the dynamic application interface 510 after the desktop assistant 410 receives a local configuration from a print service. Here, panel 518 includes user selectable icons for available printing devices HP 8100N 544, HP LaserJet® 1200 545, Plotter 546, and HP LaserJet®3330 547. In addition, pending task status reporting area 550 indicates that the mobile client has initiated two pending print task requests. A first file, letter.doc is 30% complete and is presently generating page 4 of a total of 10 pages. A second file, spreadsheet4.xls is 33% complete and is printing page 2 of a total of 3 pages. In alternative embodiments, pending task status panel 550 can include information identifying the printing device, the designated paper, and a host of other printer specific parameters.

Pointer 527 illustrates the location of a pointing device (e.g., a mouse) in a position suitable for selecting the second operator selectable switch 522. As described above, selecting the second operator selectable switch 522 instructs the desktop assistant 410 to configure the printing device resources pool on the mobile-computing device 10 to establish the select printer as the default printing device for subsequent print task requests generated from the mobile-computing device 10. The select printer in FIG. 5B is the HP LaserJet® 3330 547.

FIG. 5C illustrates the dynamic application interface 510 after the desktop assistant 410 receives an indication that both print requests have completed. Panel 518 continues to present the user selectable icons for available printing devices HP 8100N 544, HP LaserJet® 1200 545, Plotter 546, and HP LaserJet® 3330 547. Pointer 529 illustrates the location of a pointing device (e.g., a mouse) in a position suitable for selecting the third operator selectable switch 524. As described above, selecting the third operator selectable switch 524 instructs the desktop assistant 410 not to reconfigure the printing device resources pool on the mobile-computing device 10.

Figure 6A:
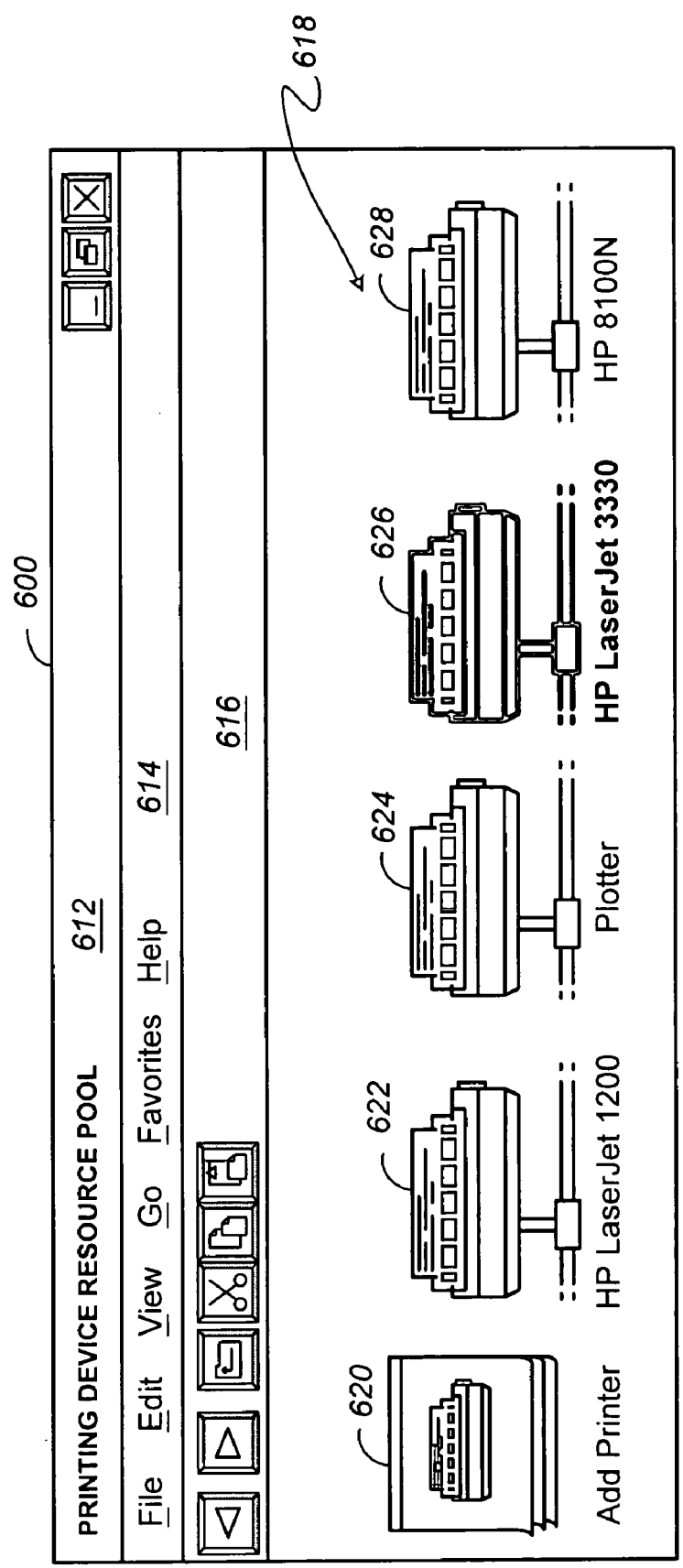
FIGS. 6A-6B illustrate an embodiment of a printer resources pool operative on a mobile-computing device as shown in FIG. 1.

FIG. 6A illustrates an embodiment of a printing device resource pool interface 600 operative on the display 500 of mobile-computing device 10 of FIG. 1. The printing device resource pool interface 600 includes a window label 612, a drop down menu bar 614, and a pushbutton menu bar 616. As illustrated in FIG. 6A, window label 612 is configured with pushbuttons to minimize and maximize the printing device resource pool interface 600 on display 500. Window label 612 further includes a pushbutton to terminate the printing device resource pool interface 600.

Panel 618 includes a number of operator selectable switches that can be manipulated to configure the printing resources available to mobile-computing device 10. The printing resources in panel 618 reflect the printer configuration and default printer selection illustrated in FIG. 5B. Panel 618 includes an add printer icon 620, as well as icons representing a HP LaserJet® 1200 622, a plotter 624, a HP LaserJet® 3330 626 and a HP 8100N 628. As described above, panel 618 reflects various printing devices available to the mobile-computing device 10 after configuration by print service 700.

The various selectable icons in panel 618 provide a second interface for an operator of the mobile-computing device 10 to select a default-printing device. As described above, selecting one of the operator selectable icons instructs the desktop assistant 410 to configure the printing device resources pool on the mobile-computing device 10 to establish the select printer as the default-printing device for subsequent print task requests generated from the mobile-computing device 10. The select printer in FIG. 6A is the HP LaserJet® 3330 626.

Figure 6B:
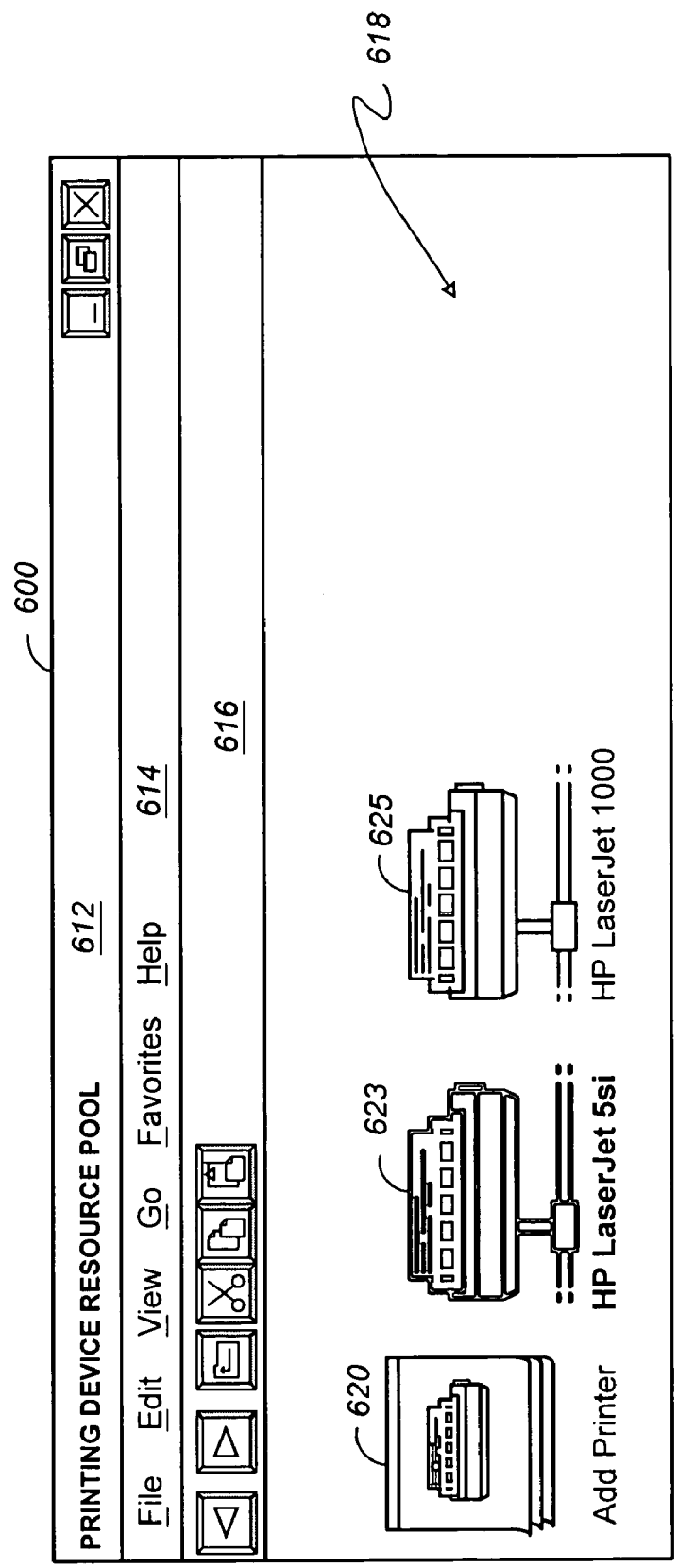

FIG. 6B illustrates the printing device resource pool after the original printing configuration on the mobile-computing device 10 is restored. As indicated in FIG. 6B, the printing device resource pool includes an HP LaserJet® 5si 623 and a HP LaserJet® 1000. The HP LaserJet® 5si 623 is the default printer. Preferably, restoration of the printing device resource pool and resetting of the default printing resource takes place automatically when the desktop assistant 410 senses that the communication session with print service 700 has been terminated. In alternative embodiments, the printing device resource pool is restored manually.

Figure 7:
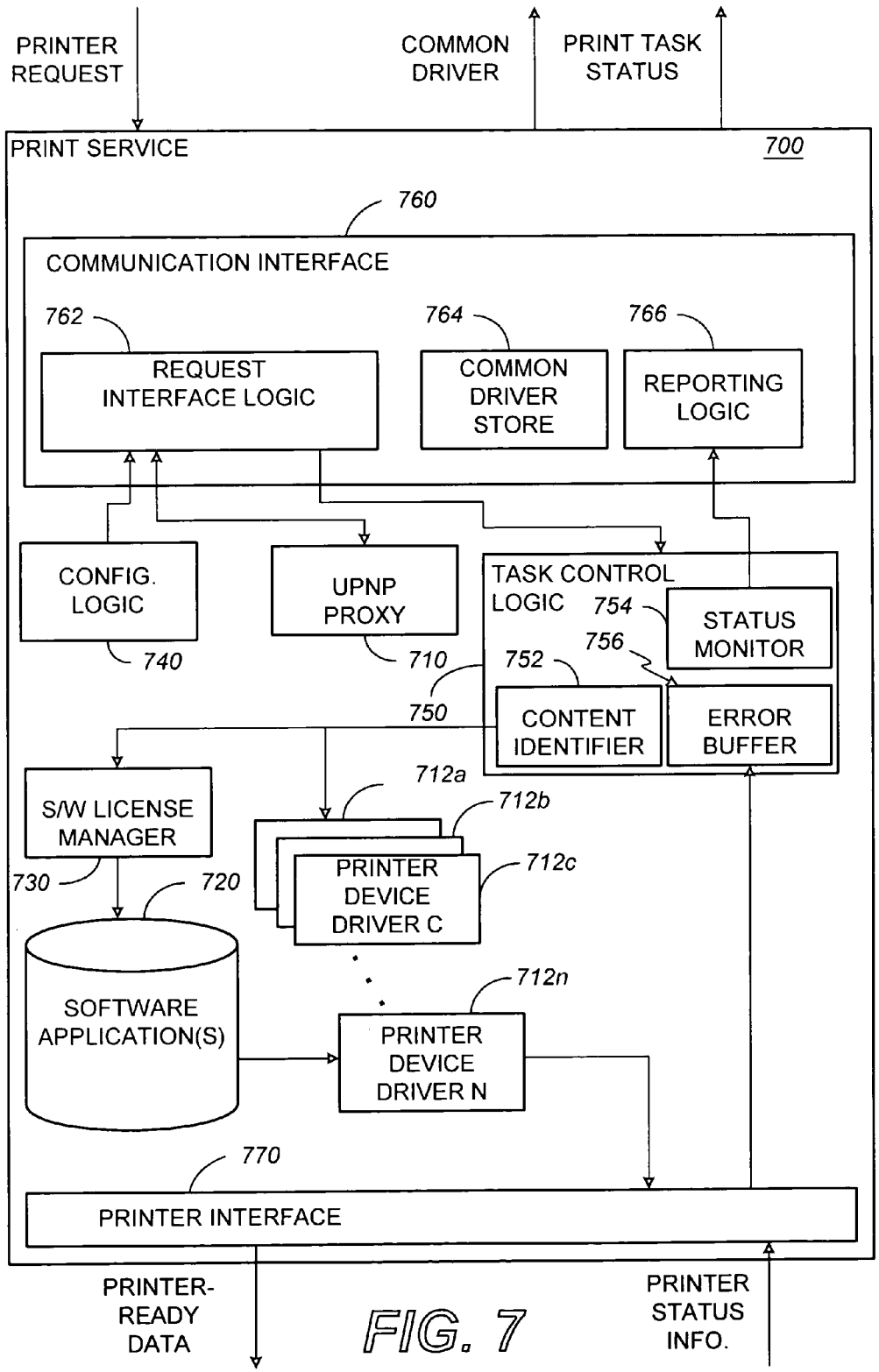
FIG. 7 is a functional block diagram of an embodiment of a print service operable on one or more of the various computing devices shown in FIG. 1.

FIG. 7 is a functional block diagram of an embodiment of a print service 700 operable on one or more of the various computing devices coupled to remote LAN 25 of FIG. 1. Print service 700 is a collection of logic modules each containing a plurality of executable instructions for performing specific tasks. As shown in FIG. 7, print service 700 receives printer requests and print commands from one or more mobile-computing device 10 (FIG. 1) at communication interface 760. In response to print task requests, communication interface 760 processes the request using request interface logic 762 and configuration logic 740. Request interface logic 762 is configured to check the client's identity and uses UPnP proxy 710 and UPnP protocols to expose or otherwise identify one or more printers coupled to remote LAN 25 that are available to receive print requests from mobile clients. UPnP uses the simple service discovery protocol (SSDP) for discovery of devices on IP-based networks. SSDP uses profiles that define the relationship between the client and the service. Clients send a user datagram protocol (UDP) multi-cast packet containing the identifier of the desired service, e.g., a print service, a printer, etc. Services listen for the multi-cast packets and respond to only those UDPs that match services that they provide. UPnP directories provide a scalable mechanism to allow discovery. When present, a directory reads and responds to all UDP requests. All each UPnP service has to do is register itself with the directory.

To simplify the discovery process, directories are treated as proxies for the service. A proxy accepts requests and takes responsibility for finding the proper response. When a proxy is present on the network, the client sends future discovery requests to the proxy. When a proxy is not present, the client sends requests via a multi-cast channel. The request format is the same in both the proxied and the unproxied networks.

The discovery response includes only that information needed to connect to the requested service or device. A description schema is then used to communicate information about service and/or device specifics. Once the client and one or more proximate printers have been identified, and device specific information communicated, request interface logic 762 polls configuration logic 740 to generate appropriate user-interface configuration information that is forwarded back to the mobile-computing device 10.

Print commands received at communication interface 760 are processed by request interface logic 762 that associates a print task identifier with the mobile-computing device 10 and/or the mobile client operating the device. Print commands contain information identifying a select printer and either contain content stored on the mobile-computing device 10 that the mobile client desires to print or a reference to content stored on a device accessible via the print service 700. The print task identifier, printer identifier, and content and/or content reference are forwarded to task control logic 750.

Task control logic 750 includes a content identifier 752, a print task status monitor 754 and an error buffer 756. The print task identifier and printer identifier are forwarded to status monitor 754 which is configured to manage and record all aspects of the remotely commanded print task. Content identifier 752 identifies the data format of the file, photograph, web page, or other content designated by the mobile client as desirable to print. When mobile-computing device generated print commands identify content stored on the mobile-computing device 10 the content is translated into printer-ready data by one of printer device driver 712*a*, 712*b*, 712*c*, . . . , 712*n* specifically configured for the respective select printer. Otherwise, when mobile-computing device generated print commands reference content stored on some other device communicatively coupled to computing device 100 (FIG. 1), content identifier 752 communicates with software license manager 730 to verify that the print service 700 is configured with the appropriate license authority to operate an appropriate software application in software application store 720. An appropriate software application is used in conjunction with one of the printer device drivers 712 to generate printer-ready data that is forwarded via printer interface 770 to the select printer.

The select printer communicates printer status information via printer interface 770 to the task control logic 750. Printer status information includes operational status, including any error conditions, source information, user configurable and default printer parameters, and print job status, etc. Printer status information is communicated to error buffer 756 and status monitor 754. As illustrated in FIG. 7, printer status information can be forwarded via task control logic 754 to reporting logic 766 which can format the information for return via communication interface 760.

As described above, print service 700 is further configured with a common driver that it provides to mobile-computing devices 10 that desire to print content using a printing resource managed and controlled by the print service 700. In the embodiment illustrated in FIG. 7, common driver store 764 within communication interface 760 contains the common driver.

Figure 8:
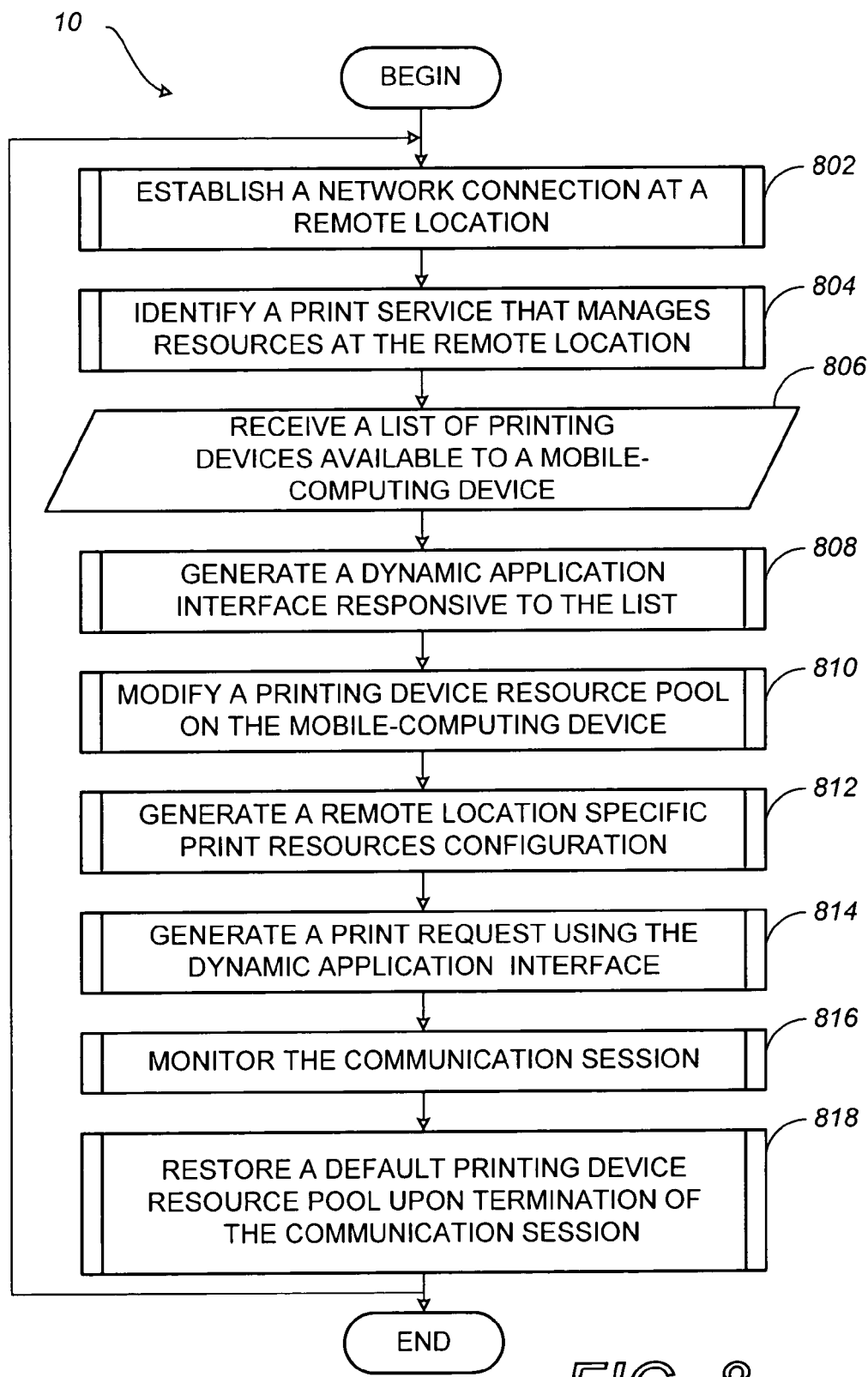
FIG. 8 is a flow diagram illustrating an embodiment of a method for managing print resources at a remote location that can be implemented by a mobile-computing device as shown in FIG. 1.

FIG. 8 is a flow diagram illustrating an embodiment of a method for managing print resources at a remote location that can be implemented by the mobile-computing device 10 of FIG. 1. As illustrated in FIG. 8, the method begins with block 802 by establishing a network connection between the mobile-computing device 10 and a network at a remote location. Once the network connection is established, the mobile-computing device 10 identifies a print service 700 configured to manage printing devices at the remote location as indicated in block 804. After identifying a suitable print service 700, mobile-computing device 10 receives a list of printing devices available to the mobile client as indicated in block 806. As shown in block 808, the mobile-computing device 10 responds by generating a dynamic application interface that includes information received concerning local printing devices identified in the received list. Mobile-computing device 10 also receives a common printing device driver that can be used by application software resident on the device to generate high-level commands that can be used to direct device specific drivers associated with the print service 700 to generate printer-ready data. Mobile-computing device 10 can receive the common printing device driver substantially concurrently with blocks 806, 808, and 810.

Thereafter, as indicated in block 812, the mobile-computing device 10 generates a remote location specific print resources configuration. The location specific print resources configuration can be stored along with an identifying name for subsequent use when mobile-computing device 10 is communicatively coupled to the print service identified in block 804. The location specific print resources configuration is preferably stored within desktop assistant 410 (FIG. 4). However, the location specific print resources configuration can be stored with operating system 222 (FIG. 2) components and/or stored with other software applications 400 resident within the memory 220 of mobile-computing device 10.

As indicated in block 814, the mobile-computing device 10 is configured to enable an operator of the device to generate one or more requests to generate hard-copy products using the print service 700 and locally available printing devices. Desktop assistant 410 operating within the mobile-computing device 10 monitors the communication session with the print service 700 as shown in block 816. As shown in block 818, upon an indication that the communication session with the print service has terminated, the desktop assistant 410 is programmed to restore a default-printing device resource pool. In this way, the mobile-computing device 10 is restored to a print management configuration operative on the device before it interacted with the print service 700 at the remote location.

Figure 9:
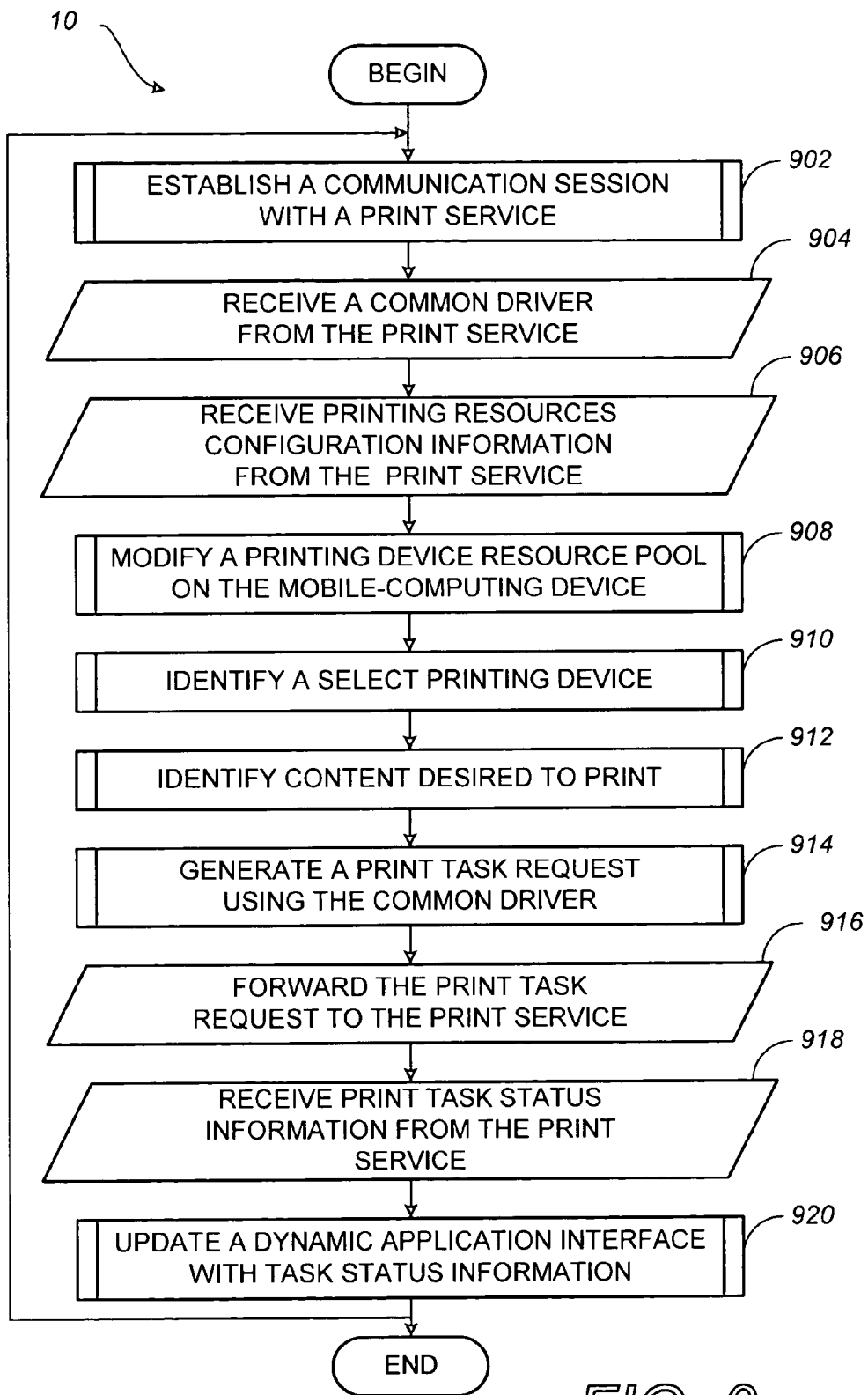
FIG. 9 is a flow diagram illustrating an embodiment of a method for printing content that can be implemented by a mobile-computing device as shown in FIG. 1.

FIG. 9 is a flow diagram illustrating an embodiment of a method for printing content that can be implemented by the mobile-computing device of FIG. 1. As illustrated in block 902, the method begins when the mobile-computing device 10 establishes a communication session with a local print service 700 (FIG. 7). Mobile-computing device 10 receives a common driver from the print service 700 in block 904. Mobile-computing device 10 also receives printing resources configuration information from the print service 700 as shown in block 906. In block 908, a printing device resource pool 224 (FIG. 2) is modified on the mobile-computing device 10 in accordance with the information received in block 906.

Thereafter, when a mobile client desires to generate a hard-copy product while visiting at the remote location served by the print service 700, the client uses the desktop assistant 410 (FIG. 4) to identify a select printing device as indicated in block 910. Note that the client can manually configure the select printer when the print service 700 makes two or more printing resources available to the client. Otherwise, the desktop assistant 410 will configure the printing resources pool on the mobile-computing device 10 to identify the available printer as the present default printer. As indicated in block 912, the mobile client identifies content desired to be translated into a hard-copy product. This can be accomplished through interfaces provided by various software applications 400 resident on the mobile-computing device 10. The interfaces may incorporate any of a number of graphical interface items such as but not limited to a context sensitive menu, a drop down menu, a menu bar, a pull down menu, a pop-up menu, etc.

As shown in block 914, the mobile-computing device 10 via the desktop assistant 410 responds by generating a print task request using the common driver provided in block 904. The print task request is forwarded over the communication link to the print service 700 as indicated in block 916. As indicated in block 918, the print task request triggers the desktop assistant 410 to monitor the communication link for print task status information from the print service 700. Print task status information may include printer specific information such as print task parameters, paper size, the number of pages printed, etc. As further shown in block 920, desktop assistant 410 may update its dynamic application interface with the print task status information as it is received.

Any process descriptions or blocks in the flow diagrams presented in FIGS. 8, 9, 11, and 12 should be understood to represent modules, segments, or portions of code or logic, which include one or more executable instructions for implementing specific logical functions or blocks in the associated process. Alternate implementations are included within the scope of the present apparatus and methods in which functions may be executed out of order from that shown or discussed, including substantially concurrently or in reverse order, depending on the functionality involved, as would be understood by those reasonably skilled in the art after having become familiar with the teachings described above.

Figure 10:
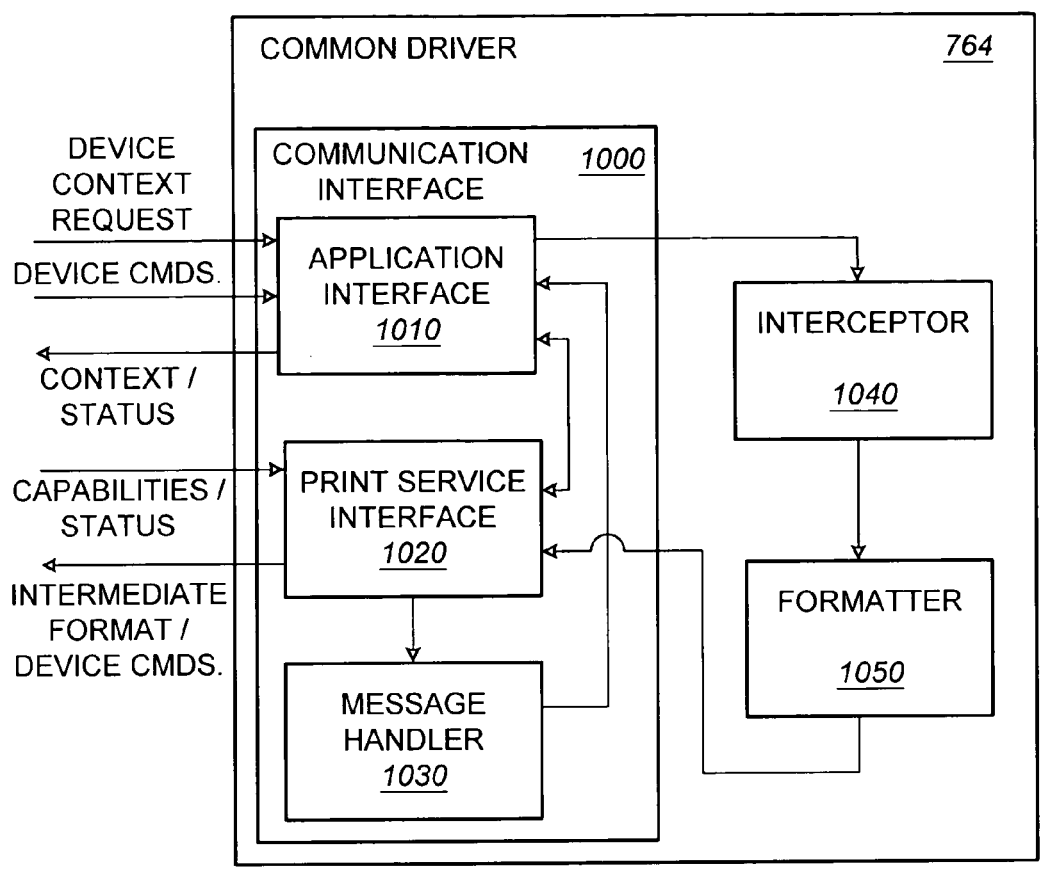
FIG. 10 is a functional block diagram of an embodiment of the common driver of FIG. 4.

FIG. 10 is a functional block diagram of an embodiment of the common driver 764 of FIG. 4. As illustrated in FIG. 10, common driver 764 includes communication interface 1000, interceptor 1040, and formatter 1050. Communication interface 1000 further includes application interface 1010 for receiving device context requests and device commands from one or more application resident on mobile-communication device 10. As further illustrated in FIG. 10, application interface 1010 is configured to forward a printer device context specific to a select printer and forward printer status information related to a print job initiated by an application.

Print service interface 1020, as shown in FIG. 10, receives printer capabilities and printer status information from a select printer. Both the printer capabilities and printer status information are forwarded to message handler 1030 before being forwarded to application interface 1010. Application interface 1010 then communicates these information items to one or more applications operable on mobile-computing device 10. Print service interface 1020 forwards an intermediate print format and/or device commands, such as graphics device commands, to print service 700.

In operation, an application on mobile-computing device 10 identifies information desired to be printed as well as a select printer coupled to print service 700. A device context contains a plurality of print device parameters that describe the capabilities of a select printer or related printers (e.g., those printers that share a common print engine). A device context includes information identifying available sources, sizes, printable area, color, etc. The device context request is recognized by application interface 1010 and forwarded to print service interface 1020 for communication to print service 700. Print service 700 receives the device context request and returns a device context corresponding to the select printer. The device context is then returned to the application.

The application uses the device context to render the information desired to be printed. Information rendering is performed by issuing a series of standard print calls or commands. For example. When the mobile-computing device 10 is using a Windows®-based operating system, standard graphics device interface commands are generated by the application. The device commands are then received by communication interface 1010 of common driver. The communication interface 1010 forwards the device commands to interceptor 1040. Interceptor 1040 identifies the commands and forwards the intercepted device commands to formatter 1050. When an intermediate format is desired, formatter 1050 is enabled and generates a print command format that is understood by print service 700. Otherwise, the device commands are forwarded to print service 700.

Print service 700 in turn receives the series of device commands or the intermediate format and applies the same to a specific driver associated with the select printer to generate printer ready data. The printer ready data is forwarded to the select printer over the network and the printer generates a hard-copy of the information desired to be printed. Prior to termination of the print job, the select printer may report interim status or a print completion status to the print service 700. The print service 700 forwards this information back to the common driver 764 for further communication to the application.

Figure 11:
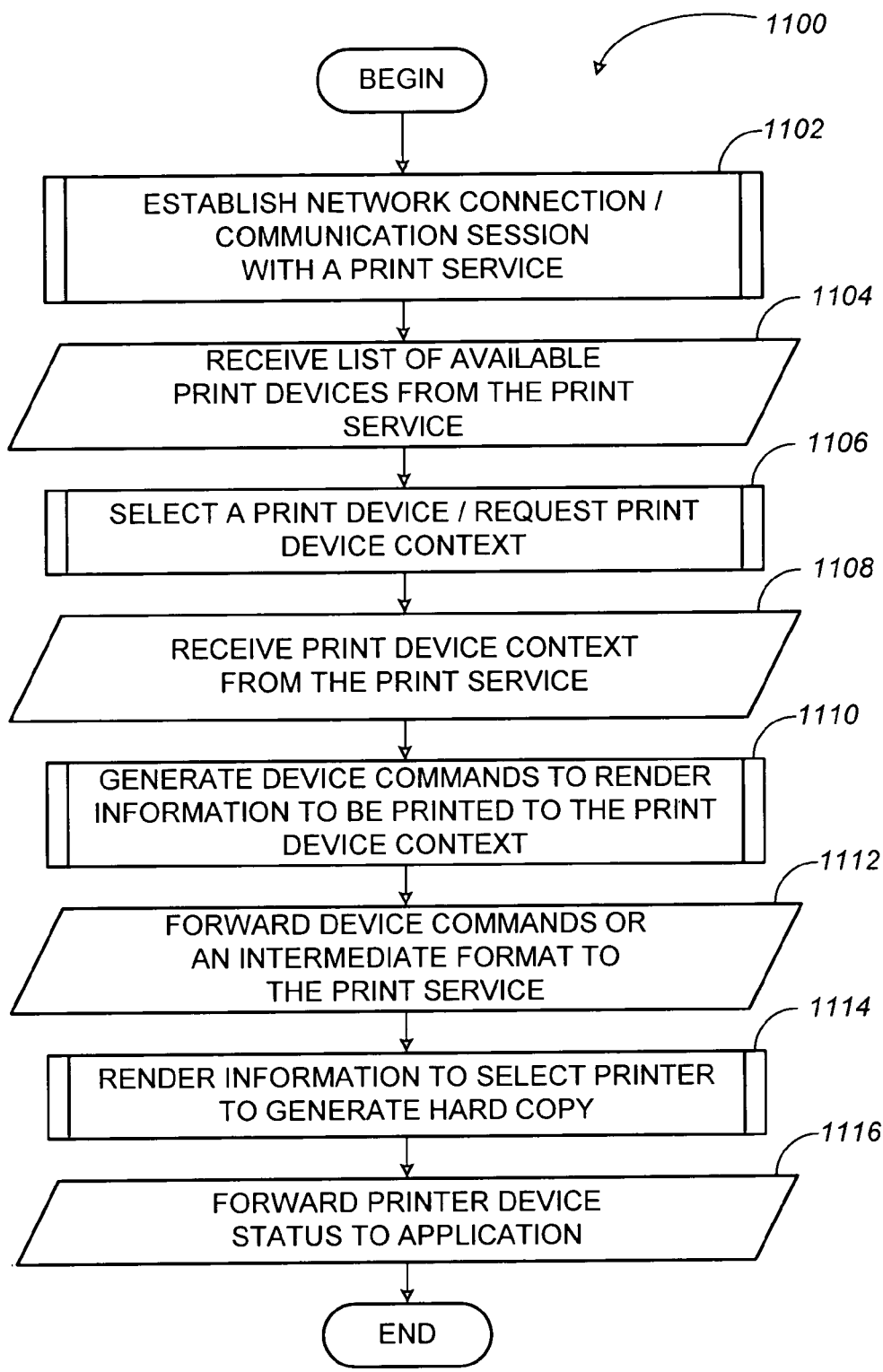
FIG. 11 is a flow diagram illustrating an embodiment of a method for printing from the mobile-computing device of FIG. 1.

FIG. 11 is a flow diagram illustrating an embodiment of a method for printing from the mobile-computing device of FIG. 1. As shown in FIG. 11, method 1100 begins by establishing a network connection and a communication session with a print service 700 as indicated in block 1102. The mobile-communication device 10 receives a list of available print resources as shown in step 1104. In block 1106, mobile-communication device 10 selects a print device and requests a print device context. Thereafter, as indicated in block 1108, mobile-communication device 10 receives the print device context from print service 700. Next, as illustrated in block 1110, an application operable on mobile-communication device 10 generates device commands to render information to be printed in accordance with the print device context. The common driver 764 forwards the device commands and/or generates an intermediate print command format responsive to the rendered information as shown in block 1112. The print service 700, in turn, renders the information to the select print device as indicated in block 1114. Print service 700 then forwards any status information from the select printer back to the common driver 764 to be communicated back to the application as illustrated in block 1116.

Figure 12:
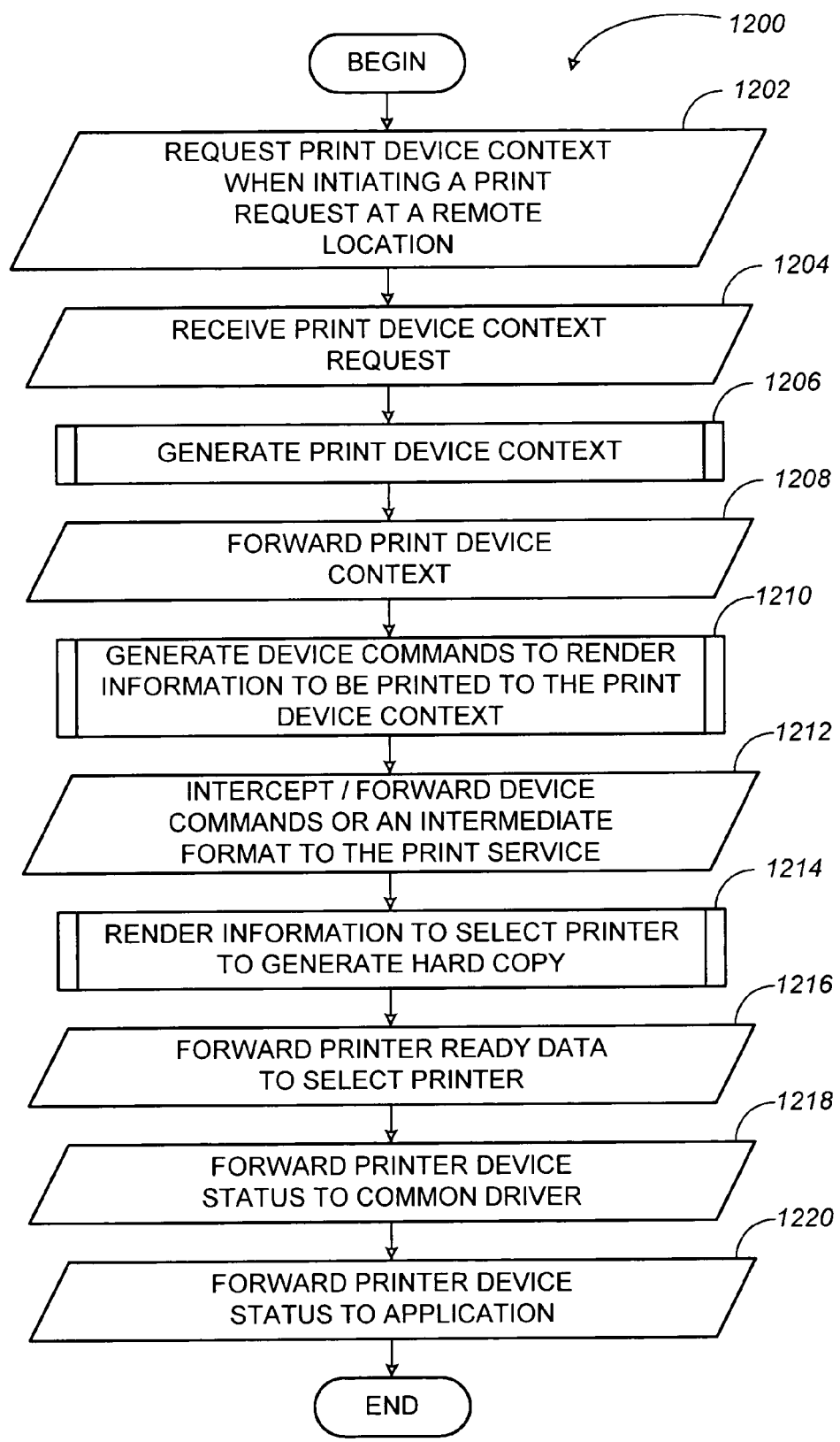
FIG. 12 is a flow diagram illustrating an alternative embodiment of a method for printing from the mobile-computing device of FIG. 1.

FIG. 12 is a flow diagram illustrating an alternative embodiment of a method for printing from the mobile-computing device of FIG. 1. As shown in FIG. 12, method 1200 begins with mobile-communication device 10 requesting a print device context as indicated in block 1202. The mobile-communication device 10 can generate the request by identifying information to be printed as well as a select printer coupled to a print service 700. An operator of the mobile-communication device 10 can use an application interface to select information to be printed as well as the printer.

The print device context request is received by a communicatively coupled print service 700 as shown in block 1204. In response, as shown in block 1206, the print service 700 generates a print device context that includes information identifying the capabilities of the select printer. After generating the print context, print service 700 forwards the print context to the application via common driver 764 as shown in block 1208. Thereafter, as indicated in block 1210, mobile-communication device 10 uses application software to generate device commands to render the information to be printed in accordance with the device context. As shown in block 1212, common driver 764 intercepts the device commands generated by the application software.

Common driver 764 operates in one of at least two operational modes. The common driver 764 operates in accordance with information provided in the printer device context. In one mode of operation, common driver 764 forwards the device commands as generated by the application software. In a second mode of operation, common driver 764 creates an intermediate print format. Thus, the operational mode of the common driver 764 is switched in accordance with the capabilities of the select printer. As indicated in blocks 1214 and 1216, print service 700 renders the information as provided in the device commands or the intermediate format by generating and forwarding printer ready data to the select printer. As indicated in block 1218, the select printer generates a printer status, which is returned to the common driver 764 via the print service 700. The common driver 764 then forwards the printer status to the application as indicated in block 1220.

We claim:

1. A method for printing information at a remote location, comprising:
    maintaining a previous configuration of a printer resources pool as a default printing device resource pool;
    establishing a network connection at a remote location;
    receiving a list of printing devices communicatively coupled to a print service available to a mobile-computing device and configuring the printer resources pool to include the list of printing devices;
    accepting and installing at the mobile-computing device a latest version of a common print driver from the print service;
    requesting a print device context responsive to a printer selected from the list of printing devices;
    using an application resident on the mobile-computing device to render information to the print device context, wherein the application generates a plurality of device commands responsive to the information to be printed;
    forwarding the device commands to the print service, wherein the print service renders the device commands against the printer; and
    upon termination of the network connection at the remote location, restoring the default-printing device resource pool as the list of printing devices that are available to be selected.

2. The method of claim 1, further comprising:
    intercepting the device commands;
    generating an intermediate format; and
    rendering the intermediate format before the step of forwarding.

3. The method of claim 1, further comprising:
    receiving a printer status from the print service.

4. The method of claim 3, further comprising:
    forwarding the printer status to the application.

5. A computer-readable memory having stored thereon an executable instruction set, the instruction set, when executed by a processor, directs the processor to perform a method comprising:
    maintaining a previous configuration of a printer resources pool as a default printing device resource pool, the printing device resource pool comprising a list of printing devices that are available to be selected by the mobile-computing device;
    sensing by the processor a change of connection status between a mobile-computing device and a wireless access device coupled to a local area network;
    establishing by the processor a communication session with a print service accessible via the local area network when the change of connection status indicates that the mobile-computing device has established a communication session with the wireless access device, wherein during the communication session, the printer resources pool is reconfigured to include a list of printing devices communicatively coupled to the print service and the mobile-computing device uses a printer driver configured to generate a generic device context responsive to a designated printer coupled to the print service;
    using the printer driver to intercept graphics device commands generated by an application operative on the mobile-computing device;
    forwarding the graphics device commands by the processor to the print service, wherein the print service renders the graphics device commands against the designated printer, wherein during the communication session, the mobile-computing device receives a common driver from the print service; and
    upon termination of the network connection at the remote location, restoring the default-printing device resource pool as the list of printing devices that are available to be selected.

6. The computer-readable memory of claim 5, wherein using the printer driver comprises generating an intermediate format and rendering the intermediate format before forwarding the graphics device commands.

7. The computer-readable memory of claim 5, further comprising:
    receiving a printer status from the print service.

8. The computer-readable memory of claim 5, further comprising:
    forwarding the printer status to the application.

9. The computer-readable memory of claim 5, further comprising:
   displaying information indicative of a printing device available to the mobile-computing device.

10. The computer-readable memory of claim 5, further comprising:
   reporting information indicative of the condition of pending print tasks.

11. The computer-readable memory of claim 5, further comprising:
   identifying a default device for print requests originating within the mobile-computing device.

12. The computer-readable memory of claim 5, further comprising:
   reconfiguring the mobile-computing device in accordance with indicia of the default device when the change of connection status indicates that the communication session with the wireless access device has terminated.

13. A mobile-computing device, comprising:
   means for maintaining a previous configuration of a printer resources pool as a default printing device resource pool, the printing device resource pool comprising a list of printing devices that are available to be selected by the mobile-computing device;
   means for responding to a change of connection status between a mobile-computing device and a wireless access device communicatively coupled to a print service;
   means for establishing a communication session with the print service when the change of connection status indicates that the mobile-computing device has established a connection with the wireless access device, wherein during the communication session, the printer resources pool is reconfigured to include a list of printing devices communicatively coupled to the print service and the mobile-computing device uses a printer driver configured to generate a generic device context responsive to a printer coupled to the print service and wherein the means for establishing a communication session further comprises means for receiving a common driver;
   means for intercepting graphics device commands generated by an application operative of the mobile-communication device;
   means for forwarding the graphics device commands to the print service, wherein the print service renders the graphics device commands in accordance with the printer; and
   means for restoring the default-printing device resource pool as the list of printing devices that are available to be selected upon termination of the network connection at the remote location.

14. The mobile-computing device of claim 13, wherein the means for establishing a communication session with the print service comprises an application program.

15. The mobile-computing device of claim 13, wherein the means for intercepting graphics device commands comprises a printer driver.

16. The mobile-computing device of claim 13, further comprising:
   print task initialization means for receiving a user-selected input indicative of content desired to be printed by the printing device.

17. The mobile-computing device of claim 16, further comprising:
   monitoring means for observing the condition of pending print tasks.

18. A mobile-computing apparatus, comprising:
   a processor;
   a memory coupled to the processor having stored therein a driver comprising:
      a communication interface including:
         an application interface for communicatively coupling the driver to an application executing within the processor; and
         a print service interface for communicatively coupling the driver to a print service wirelessly coupled to the mobile-computing apparatus, wherein the mobile-computing apparatus receives the driver from the print service;
   an interceptor coupled to the communication interface, the interceptor configured to identify and forward graphics device commands issued by the application; and
   a formatter coupled to the interceptor, wherein when the formatter is enabled, the formatter renders information desired to be printed from the mobile-communication device to an intermediate format communicated to the print service, wherein the application interface is enabled to maintain a previous configuration of a printer resources pool as a default printing device resource pool, the printing device resource pool comprising a list of printing devices that are available to be selected by the mobile-computing apparatus, and to restore the default-printing device resource pool as a list of printing devices that are available to be selected upon termination of a network connection with the print service.

19. The apparatus of claim 18, wherein when the formatter is disabled, the interceptor forwards the graphics device commands to the print service for rendering via a printer driver compatible with a select printer coupled to the print service.

20. The apparatus of claim 18, further comprising:
   a message handler configured to receive indicia of a printer status.

21. The apparatus of claim 20, wherein the message handler is configured to forward the printer status via the application interface to the application.

* * * * *